US006631382B1

(12) United States Patent
Kouchi et al.

(10) Patent No.: US 6,631,382 B1
(45) Date of Patent: Oct. 7, 2003

(54) DATA RETRIEVAL METHOD AND APPARATUS WITH MULTIPLE SOURCE CAPABILITY

(75) Inventors: David B. Kouchi, Kirkland, WA (US); David Yarnall, Anacortes, WA (US); Donald K. Babcock, Tacoma, WA (US)

(73) Assignee: Timeline, Inc., Bellevue, WA (US)

( * ) Notice: Subject to any disclaimer, the term of this patent is extended or adjusted under 35 U.S.C. 154(b) by 0 days.

(21) Appl. No.: 09/628,541

(22) Filed: Jul. 31, 2000

Related U.S. Application Data

(63) Continuation of application No. 09/318,076, filed on May 25, 1999, now abandoned, which is a continuation of application No. 09/106,538, filed on Jun. 29, 1998, now Pat. No. 6,023,694, which is a continuation-in-part of application No. 08/593,118, filed on Feb. 1, 1996, now Pat. No. 5,802,511, which is a continuation-in-part of application No. 08/582,062, filed on Jan. 2, 1996, now abandoned.

(51) Int. Cl.[7] .............................................. G06F 17/30
(52) U.S. Cl. ...................................................... 707/102
(58) Field of Search ......................................... 707/102

(56) References Cited

U.S. PATENT DOCUMENTS

| | | | | |
|---|---|---|---|---|
| 4,688,195 A | * | 8/1987 | Thompson et al. | 706/11 |
| 4,774,655 A | | 9/1988 | Kollin et al. | 364/200 |
| 4,961,139 A | | 10/1990 | Hong et al. | 364/200 |

(List continued on next page.)

FOREIGN PATENT DOCUMENTS

| | | | | |
|---|---|---|---|---|
| CN | 1061667 A | 6/1992 | | G06F/15/40 |
| EP | 0 586 157 A2 | 3/1994 | | G06F/15/403 |
| GB | 2 283 588 A | 5/1995 | | G06F/3/00 |
| WO | WO 97/20258 | 5/1997 | | G05B/13/00 |

OTHER PUBLICATIONS

*Arbor Integration Server*; Arbor Aspects; Aug. 1998 pp. 4–6.
Hall, Curt, Editor; Data Management Strategies; from Cutter Information Corp; Jul. 1998; vol. II, No. 7; pp. 1–13.
*What is Data Warehousing*; http://www.xcoyle.com/Outcomes/tsId002.htm.
*Why Have a Data Mart?*; http://www.breuer.com/data3.htm.
Becker, Marie; Product Review of Manufacturer SQI Financials International, Inc.; Data Management Review; Sep. 1996; p. 54.
McKie, Stewart; *Taming the Data Deluge*; Business Finance; Nov. 1998, p. 34.

(List continued on next page.)

*Primary Examiner*—Wayne Amsbury
(74) *Attorney, Agent, or Firm*—Richard L. Hughes

(57) ABSTRACT

Generation of output or reports on information contained in a data source which may be any of two or more types of source data, in a standardized or uniform manner is provided. A plurality of drivers are provided specific to different types of source data which include programming for identifying structural or other characteristics of the various data sources, e.g. for use in defining a new database. Preferably the new database is configured to permit highly flexible and/or rapid output or reporting or is otherwise optimized for reporting purposes. In one embodiment, the present invention includes conversion of one or more data sources into one or more uniform databases, preferably generating one or more key categories for organizing the data, optionally generating category groupings or rollups and additional data or optional references. In one embodiment, one or more databases are created which have a degree of uniformity of structure, even though they may be based on two or more different data sources which may have very different structures. The different data sources are automatically analyzed and this analysis can be used to identify and/or create categories of data for use in organizing the database.

29 Claims, 9 Drawing Sheets

U.S. PATENT DOCUMENTS

| | | | |
|---|---|---|---|
| 5,058,000 A | 10/1991 | Cox et al. | 364/200 |
| 5,210,824 A | 5/1993 | Putz et al. | 395/145 |
| 5,263,159 A | 11/1993 | Mitsui | 395/600 |
| 5,278,978 A | 1/1994 | Demers et al. | 395/600 |
| 5,283,894 A * | 2/1994 | Deran | 707/1 |
| 5,359,724 A | 10/1994 | Earle | 395/425 |
| 5,388,259 A | 2/1995 | Fleischman et al. | 395/600 |
| 5,402,526 A * | 3/1995 | Bauman et al. | 706/49 |
| 5,416,917 A | 5/1995 | Adair et al. | 395/500 |
| 5,428,782 A | 6/1995 | White | 395/650 |
| 5,446,880 A | 8/1995 | Balgeman et al. | 395/600 |
| 5,446,883 A | 8/1995 | Kirkbride et al. | 395/600 |
| 5,448,726 A | 9/1995 | Cramsie et al. | 395/600 |
| 5,450,581 A | 9/1995 | Bergen et al. | 355/600 |
| 5,459,827 A | 10/1995 | Allouche et al. | 707/513 |
| 5,463,555 A | 10/1995 | Ward et al. | 364/468 |
| 5,475,836 A | 12/1995 | Harris et al. | 395/600 |
| 5,493,671 A | 2/1996 | Pitt et al. | 395/500 |
| 5,495,606 A | 2/1996 | Borden et al. | 395/600 |
| 5,509,136 A | 4/1996 | Korekata et al. | 395/478 |
| 5,513,348 A | 4/1996 | Ryu et al. | 395/600 |
| 5,522,066 A | 5/1996 | Lu | 375/600 |
| 5,555,201 A * | 9/1996 | Dangelo et al. | 703/13 |
| 5,555,403 A | 9/1996 | Cambot et al. | 395/600 |
| 5,560,005 A | 9/1996 | Hoover et al. | 395/600 |
| 5,608,904 A | 3/1997 | Chaudhuri et al. | 395/602 |
| 5,613,142 A | 3/1997 | Matsumoto | 395/602 |
| 5,615,109 A * | 3/1997 | Eder | 585/639 |
| 5,627,996 A | 5/1997 | Bauer | 395/500 |
| 5,628,003 A | 5/1997 | Fujusawa et al. | 395/615 |
| 5,630,125 A * | 5/1997 | Zellweger | 707/102 |
| 5,659,742 A | 8/1997 | Beattie et al. | 707/104 |
| 5,671,404 A | 9/1997 | Lizée et al. | 395/605 |
| 5,680,618 A | 10/1997 | Freund | 395/616 |
| 5,687,363 A | 11/1997 | Oulid-Aissa et al. | 395/604 |
| 5,701,456 A | 12/1997 | Jacopi et al. | 395/604 |
| 5,701,466 A | 12/1997 | Yong et al. | 395/611 |
| 5,708,828 A | 1/1998 | Coleman | 395/785 |
| 5,724,569 A | 3/1998 | Andres | 395/602 |
| 5,734,915 A | 3/1998 | Roewer | 395/773 |
| 5,752,021 A | 5/1998 | Nakatsuyama et al. | 395/605 |
| 5,794,246 A | 8/1998 | Sankaran et al. | 707/101 |
| 5,802,511 A * | 9/1998 | Kouchi et al. | 707/1 |
| 5,852,825 A | 12/1998 | Winslow | 707/6 |
| 5,870,725 A | 2/1999 | Bellinger et al. | 705/45 |
| 5,881,378 A | 3/1999 | Hayashi et al. | 707/100 |
| 5,948,040 A * | 9/1999 | DeLorme et al. | 340/990 |
| 5,987,302 A * | 11/1999 | Driscoll et al. | 382/321 |
| 5,999,908 A * | 12/1999 | Abelow | 434/118 |
| 6,023,694 A * | 2/2000 | Kouchi et al. | 707/2 |
| 6,038,558 A | 3/2000 | Powers et al. | 707/2 |

OTHER PUBLICATIONS

Data Management Review; Product Review/Survey for Manufacturer Legent Corporation; Jul. 1994; p. XV.

Data Management Review; Product Review/Survey for Manufacturer Informatica Corporation; Jul. 1994; p. XI.

Data Management Review; Product Review/Survey for Manufacturer Asymetrix Corporation; Aug. 1994; p. 14.

Press Releases for Platinum technology, inc.; Jun. 12, 1995, 2 pages; Jul. 25, 1994, 2 pages; Sep. 19, 1995, 2 pages; Oct. 10, 1995,2 pages; Oct. 10, 1995, 2 pages; Dec. 13, 1995, 3 pages.

Press Releases for Oberon Software Inc.; May 5, 1998.

Carraway, Joyce; Review of ETI Extract; Manufacturer Evolutionary Technologies International; Data Management Review; Jul./Aug. 1996, p. 83.

Data Migration Tools: ETI Extract; Jul. 1, 1997; p 4735.

Latimer, Gary; Data Management Review; Manufacturer: Vality Technology Inc.; Jan. 1996; p. 56.

Germon, Barbara; Data Management Review; Manufacturer: Prism Solutions Inc.; Jul./Aug. 1996; p. 62.

Monaghan, Pam; Data Management Review; Manufacturer: Carleton Corporation; Jul./Aug. 1996; p. 60.

Zozulia, Mark; Data Management Review; Manfacturer: Cognos; Jul./Aug. 1996; p. 63.

Nguyen, Nam; Data Management Review; Manufacturer: Sybase Inc.; Jul./Aug. 1996; p. 64.

Ettlinger, Ben; Data Management Review; Manfacturer: Logic Works, Inc.; Sep. 1996; p. 44.

Transact–SQL Reference; Creating a New Table for Results: SELECT INTO; pp. 42–45.

*Quicken User's Guide*; Intuit, Inc.; 1994; Version 4; p. 220.

Press Release dated May 2, 1995; Computer Software Industry; Business, General; Companies Initiate Joint Effort to Integrate Informatica's OpenBridge Software with Key Components of Sybase's Warehouse WORKS data Warehouse Framework.

*Data Warehouse Implementation Plan*; http://www.island.net/˜gordon/dwhplan.htm.

Grace, John A. and James K. Pinkelman, Ph.D; Product Whitepaper; Objectized SOQL; Geppetto's Workship L.L.C.; http://www.geppetto.com/OSQL48.htm.

Pilot Software White Paper, an Introduction to OLAP; http://www.pilotsw.com/olap/olap.htm.

Press Release dated May 2, 1995; Informatica Announces OpenBridge; New Data Extraction Software Dramatically Streamlines Construction of Data Warehouses.

*Timeline, Inc.'s Complaint for Patent Infringement, Breach of Contract and Misappropriation of Trade Secrets*, Case No. C–99–0414C, Timeline, Inc. v. Sagent Technology, Inc., United States District Court, Western District of Washington at Seattle, Mar. 22, 1999.

*Answer of Defendant Sagent Technology, Inc. to Complaint*; Case No. C–99–0414C, Timeline, Inc. v. Sagent Technology, Inc., United States District Court, Western District of Washington at Seattle, Apr. 19, 199.

*Defendant's Second Supplemental Responses to Plaintiff's First Set of Interrogatories*; Case No. C–99–0414C, Timeline, Inc. v. Sagent Technology, Inc., United States District Court, Western District of Washington at Seattle; Sep. 28, 1999.

*Sagent Technology, Inc.'s Disclosures Under Civil Local Rule 26(a)(2)(B)*; Case No. C–99–0414C, Timeline, Inc. v. Sagent Technology, Inc., United States District Court, Western District of Washington at Seattle; Jan. 10, 2000.

Sagent Technology, Inc.'s Supplemental Disclosure of David McGoveran's Expert Testimony; Case No. C–99–0414C, Timeline, Inc. v. Sagent Technology, Inc., United States District Court, Western District of Washington at Seattle; Mar. 8, 2000; with attachements: *Getting Started*; Borland dBase for Windows, Version 5; 1994 *User's Guide*; Microsoft Access; Version 1.1; 1993 *User's Guide*; Watcom SQL; 4th Edition; 1994 *User's Guide*; Paradox for Windows; Version 1.0; Borland; 1992 *Quick Start*; Version 3.0; GUPTA Corporation; 1994 *User's Guide*; Microsoft Fox-Pro; 1993 *Data Juncetion® User's Guide*; Version 4.0; Tools & Techniques Inc.; 1990.

*Timeline, Inc.'s Complaint for Patent Infringement*; Timeline, Inc. v., Broadbase Software, Inc., Case No. C–99–1172, United States District Court, Western District of Washington at Seattle, Jul. 21, 1999.

Data Junction® User's Guide; Version 4.2; Tools & Techniques Inc.; Austin, Texas; 1993.

DataPlex User's Guide; Version 1.0; Tools & Techniques Inc.; Austin Texas; 1986.

Data Junction® User's Guide; Version 4.0; Tools & Techniques Inc.; Austin, Texas; 1990.

Data Junction® User's Guide; Version 5.1; Tools & Techniques Inc.; Austin, Texas; 1995.

Advertisement; *Data Junction® Converts Data Files*.

Advertisement; Data Junction; *Finally! A product that deals with the vast number of software formats*; 1989.

Blackledge, Brian; Product Review; *Data Junction—a Review*; The Clarion Tech Journal; Jan.–Feb. 1990.

Roland, Jon; Product Review; *A Versatile Data Formal File Connector*; UnixWorld Jul. 1989.

Press Release; *Prism Warehouse Manager Release 2.5 Offers LAN Support, Automatic Data Capture Capabilities*; Jun. 14, 1993.

Press Release; *Prism Warehouse Manager Release 3.0 Transforms DB2 Legacy Data to a Data Warehouse*; Oct. 1, 1993.

Press Release; *Prism Unveils New Data Warehouse Management Software; May 24, 1994.*

Press Release; *Prism Solutions Delivers Integrated Products for Building, Maintaining and Navigating Data Warehouses*; May 2, 1995.

*Prism Warehouse Manager™ Release History; Jun. 24, 1999.*

Prism Warehouse Manager™ Reference Manual; Version 4.3; 1994.

STAR/C™ Application Programmer's Reference; VMARK Software, Inc.; Westboro, Massachusetts; 1995.

Shu, N.C., B.C. Housel, R.W. Taylor, S.P Ghosh and V.Y. Lum; *EXPRESS: A Data EXtraction, Processing, and REStructuring System*; ACM Transactions on Database Systems; vol. 2, No. 2; Jun. 1977; pp. 134–174.

Shu, N.C., Barron C. Housel and V.Y. Lum; *CONVERT: A High Level Translation Definition Language for Data Conversion*; Communications of the ACM; vol. 18, No. 10; Oct. 1975; pp. 557–567.

Lum, V.Y., N.C. Shu, and B.C. Housel; *A General Methodology for Data Conversion and Restructuring*; Data Conversion;;Sep. 1976; pp. 889–897.

Birss, E.W. and J.P. Fry; *Generalized Software for Translating Data*; National Computer Conference; 1976; pp. 889–897.

Rin, N.A. and M. Brown; *An Overview of a System for Automatic Generation of File Conversion Programs*; Software–Practice and Experience; vol. 5; 1975; pp. 193–202.

Zloof, M.M. and S. P. de Jong; *The System for Business Automation (SBA): Programming Language*; Communications of the ACM; vol. 20, No. 6; Jun., 1997; pp. 385–396.

Albert, J., R. Ahmed, M. Ketabchi, W. Kent, and M. Shan; *Automatic Importation of Relational Schemas in Pegasus*; IEEE; 1993; pp. 105–113.

Castellanos, M.; *Semantic Enrichment of Interoperable Databases*; IEEE; 1993; pp. 126–129.

Hansen, D.M. et al.; "Using an Object–Oriented Database to Encapsulate Heterogeneous Scientific Data Sources"; *Proceedings of the Twenty–Seventh Annual Hawaii International Conference on System Sciences*; vol. III; Jan. 1994; pp. 408–417, IEEE Computer Society.

* cited by examiner-

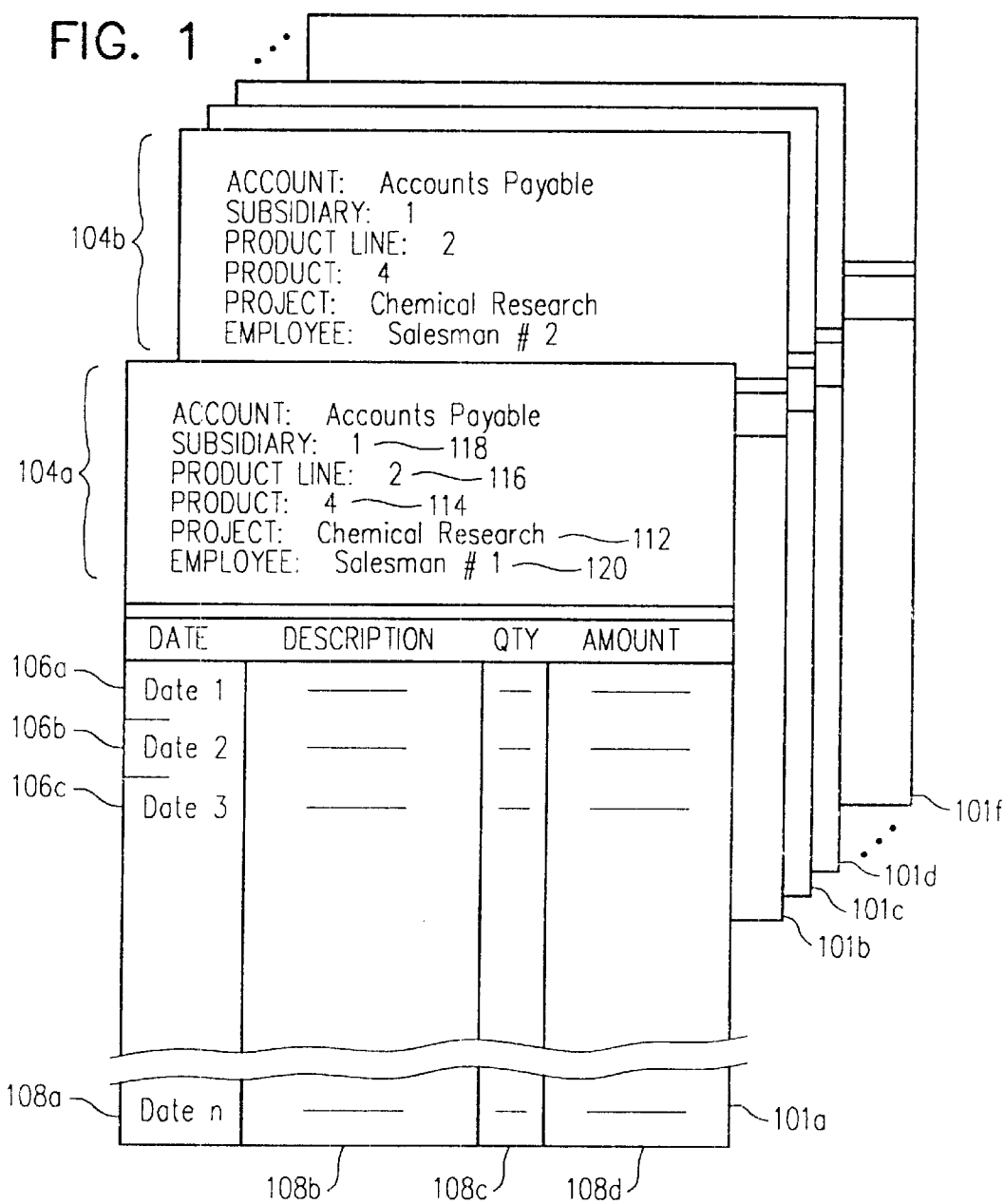

FIG. 4A

| INDEX | DATE | DESCRIPTION | QTY | AMT |
|-------|------|-------------|-----|-----|
| 1 | | | | |
| 2 | | | | |
| 3 | | | | |
| ... | | | | |
| n | | | | |

| INDEX | ACCOUNT |
|-------|---------|
| 1000 | CASH-BANK 1 |
| 1010 | CASH-BANK 2 |
| ... | ... |
| 9999 | ACCOUNTS RECEIVABLE |

| INDEX | NAME | LOCATION |
|-------|------|----------|
| 10 | SALESMAN 1 | NW REGION |
| 20 | SALESMAN 2 | SE REGION |
| 30 | RESEARCHER 1 | CENTRAL REGION |
| ... | ... | ... |
| 40 | REASEARCHER 2 | CENTRAL REGION |

| TRANS. INDEX | ACCOUNT INDEX | EMPLOYEE INDEX | SUBSIDIARY INDEX |
|--------------|---------------|----------------|------------------|
| 1 | 1010 | 20 | 200 |
| 2 | 1000 | 40 | 100 |
| 3 | 9999 | N.A. | 200 |
| ... | ... | ... | ... |
| n | 1000 | 10 | 100 |

| INDEX | COMPANY |
|---|---|
| 100 | COMPANY 1 |
| 200 | COMPANY 2 |
| 300 | COMPANY 3 |

| INDEX | QUERY |
|---|---|
| 1 | SELECT GL. ACCOUNT PART WHERE ACCOUNT = "CASH-BANK 1" |

FIG. 5

C:\Tables\Table1
C:\Tables\Table2
C:\Tables\Table
C:\Links\Link1
C:\Queries\Query1
C:\Queries\Query2
C:\Reports\Report1
C:\Reports\Report2

LOCATION: France, Paris
UNIT: Celsius

LOCATION: US – New York
UNIT: Farenheit

| DATE | 1 AM | 2 AM | 3 AM | ... | MIDNIGHT |
|---|---|---|---|---|---|
| DATE 1 | — | — | — | | — |
| DATE 2 | — | — | — | | — |
| DATE n | | | | | |

604, 606a, 606b, 606c

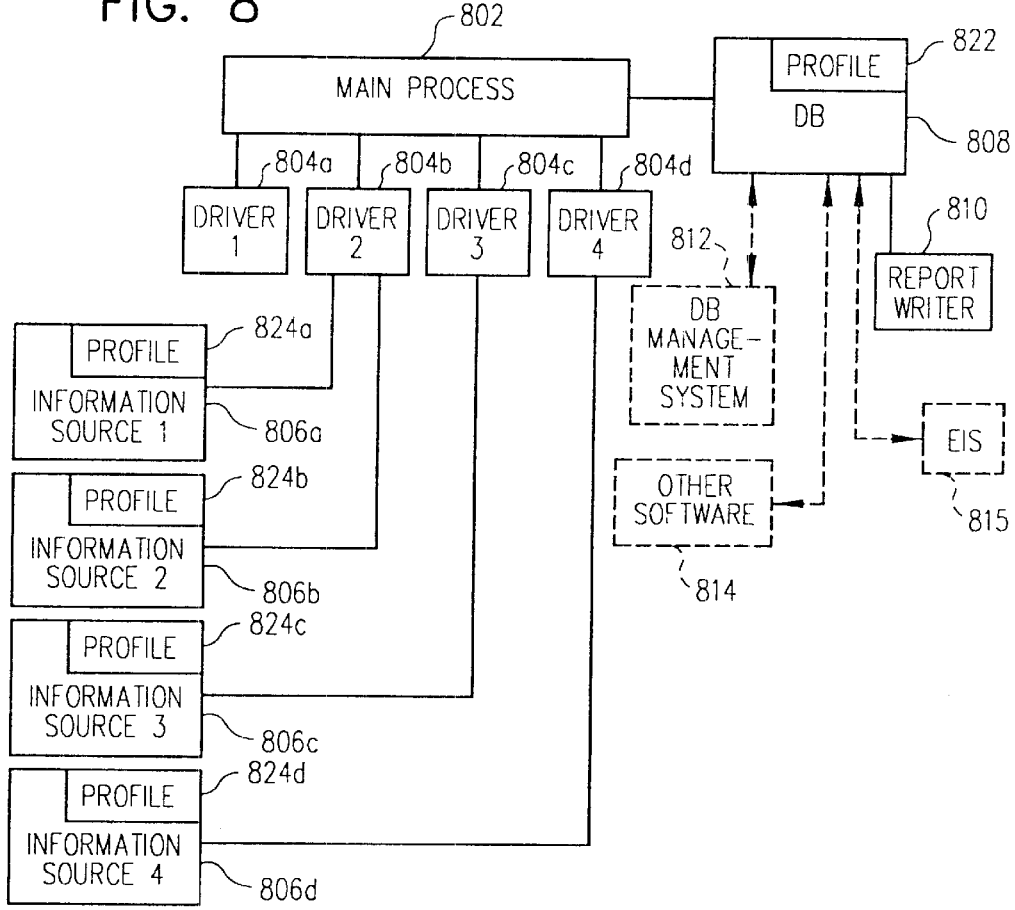

DIR C:\BRANDDBS\TAB*\*.*>D:\STOREDIR.DB2

DIR C:\TABLES\TABLE*.*>D:\STOREDIR.DB1
DIR C:\LINKS\L*.*>D:\STOREDIR.DB2
DIR C:\QUEIRES\Q*.*>D:\STOREDIR.DB3
DIR c:\REPORTS\R*.*>D:\STOREDIR.DB4

DATA RETRIEVAL METHOD AND APPARATUS WITH MULTIPLE SOURCE CAPABILITY

This is a continuation of U.S. patent application Ser. No. 09/318,076 filed May 25, 1999, now abandoned, which is a continuation of U.S. patent application Ser. No. 09/106,538 filed Jun. 29, 1998, now U.S. Pat. No. 6,023,694, which is a continuation-in-part of U.S. patent application Ser. No. 08/593,118 filed Feb. 1, 1996, now U.S. Pat. No. 5,802,511, which is a continuation-in-part of U.S. patent application Ser. No. 08/582,062 filed Jan. 2, 1996, now abandoned, all of which are incorporated herein by reference.

The present invention relates to a computer-implemented system which is able to retrieve information stored in one or more of a number of different sources and which may be in any of a number of different formats and/or provide reports and analysis based on the information, and in particular to a computer method and apparatus which can automatically retrieve database information stored in any of a plurality of formats, including structural and/or relational information, without the need for relying on human analysis of the source data.

BACKGROUND INFORMATION

A number of ways of organizing computer-accessible information have developed, such as relational or hierarchical database management systems, flat file data systems, spreadsheet systems, and the like. These systems are used for storing, manipulating and displaying a myriad of types of information, including accounting or other financial information, scientific or technical data, corporate or business data, name, address and telephone data and statistical data. Many formats and data structures have been developed, and this situation has both desirable and undesirable ramifications. On the positive side, by having a multiplicity of different types of systems, it is possible to provide different systems which are optimized for different purposes (e.g., optimized for data entry or storage vs. speed or flexibility of data analysis and reporting, optimized for accounting data vs. company data, and the like), or which provide user interfaces or other characteristics which may appeal to personal or company preferences. This multiplication of information systems, however, provides a substantial barrier in situations in which it would be useful to have access to information in two or more such systems, e.g. to coordinate or combine such information. Examples of such situations include: (1) an accountant who wishes to produce standardized reports but who has multiple clients, each of whom keeps its accounting data in a different type of data source: (2) a corporation with several divisions which wishes to produce uniform reports, but in which different divisions use different corporate or financial software; (3) a corporation which wishes to produce uniform reports, but which keeps its accounting information on a first type or brand of database (or other data source), and its corporation information on a second and different type of database; (4) a group of scientists investigating a common problem, each of whom stores or has access to data kept in a different type or brand of database or other data source. Other examples will occur to the reader after understanding the present disclosure. Additionally in some situations, when all the desired information in a single type of data source or even all stored in a single data file, it may be desirable to provide a manner of accessing the data, e.g., to provide for uniform and/or enhanced reporting and analysis of the data.

Such situations present difficulties for a number of reasons, including the difference in manners of organizing information and differences between types of data sources. In some situations, similar categories of information may be organized in different ways, even if the same database software is being used. For example, in a first instance, using a first database software package, a user might organize a company's personnel records such that all of the company's personnel names are stored in a first table or list, all of the addresses are stored in a second table or list, and all of the telephone numbers are stored in a third table or list, and pointers or links are stored to indicate which names are associated with which addresses and which phone numbers. However, another instance using the same software might occur in which a different person organizing personnel information might provide a single table in which each line or "record" of information includes a name, an address and a telephone number, thus without any links or pointers from a record in one table to a record to another table.

Additionally, different types of data sources may have different structures and/or different data storage formats or schemes. For example, some database packages are organized in a hierarchical manner (e.g., in a tree-fashion), while others may be organized as relational databases (modeled on two-dimensional tables of rows and columns). Furthermore, information may be stored in forms that are not, strictly speaking, database forms such as storing data in a "flat file" form, as a spreadsheet, and the like. Additionally, different types of data sources may store the data in various formats. For example, some database products store each table, each reporting format and each query as a separate file on a storage device such as a hard disk, while other software may store all tables, relationships, queries, report formats, etc., in a single file. Some products may store each record and/or field as fixed length data and/or at a fixed position in a file, while others may use delimiters to distinguish between one record and the next or between one field and the next within a record. Even if two different software products store a particular type of information at a predetermined location, such location may be different for the different software products. Furthermore, data may be encoded differently in different software products, such as using ASCII encoding in one product and multi-lingual (multi-byte) characters in another product. In some cases, data may be compressed and/or encrypted.

In view of the wide variation among types of data, in the past, when it was desired to access stored information (e.g. to standardize reports and analysis and/or to combine or coordinate information from two or more databases), a consultant or other expert individually or "manually" analyzed each "source" data file or database to understand its structure, relationship data storage format, the organization of the data within the database, and the like. The expert would then construct some manner of import or querying of the data in the source data file or database in order to achieve the desired access, coordination or combination. Although this approach is operable, it is labor-intensive, since it requires human analysis, and is also time-consumptive since a relatively long period of time is typically required for the expert or consultant to complete the task of analyzing, often requiring days or weeks for the access, coordination or combination to be achieved.

Accordingly, it would be useful to provide a system in which information in various formats or forms or organized in various ways can be accessed combined and/or coordinated, while reducing or eliminating the need for human analysis, thus providing a system which is at least partially automated and preferably less labor-intensive and less time-consumptive than certain previous methods.

SUMMARY OF THE INVENTION

The present invention relates to a system which achieves access to stored information, e.g., for accessing information or for achieving coordination and/or combination of information in trio different information storage systems. Preferably, some or all the analysis involved is performed automatically (i.e., without the need for human analysis), in one embodiment, using a properly programmed computer.

In one embodiment, information, preferably including at least some information which is obtained automatically from the data source, is used in defining and/or populating a new database. In some embodiments, more than one database can be provided. For example, a first new database can be used as a source for distributing information to a plurality of information consumers and the distributed information may, itself be in the form of a plurality of databases, which may be different from one another.

Preferably, the system is flexible in that it is not inherently limited in the data formats it can access but can be configured to obtain data from virtually any computer-readable information source. Preferably the system is extensible. (more preferably, modularly extensible) in that components can be added to permit it to access additional types, formats or organizations of data. In one embodiment, the access, coordination or combination of data is accompanied by an enhancement of data analysis, i.e., providing types of data analyses and,/or reporting not found or used in the original data source. Preferably, the system can be used to provide for standardization of data analysis or reporting across several types of data sources. In one embodiment, the system uses the contents of the source data files or databases, as well as information about the structure, in order to achieve the desired results (such as by using text recognition, artificial intelligence, and/or expert systems). In one embodiment, the system uses such information to at least partially control the manner in which data is made available for analysis or reporting. In one embodiment, the system uses such information in providing such analysis or reports.

Generation of output or reports on information contained in a data source which may be any of two or more types of source data, in a standardized or uniform manner is provided. A plurality of drivers are provided specific to different types of source data which include programming for identifying structural or other characteristics of the various data sources, e.g. for use in defining a new database. Preferably the new database is configured to permit highly flexible and/or rapid output or reporting or is otherwise optimized for reporting purposes. In one embodiment, the present invention includes conversion of one or more data sources into one or more uniform databases, preferably generating one or more key categories for organizing and/or validating the data, optionally generating category groupings or rollups and additional data or optional references.

In one embodiment, the present invention creates or populates a database, based on accounting or other data converted from existing data files, such as data files created by previous accounting or other software.

BRIEF DESCRIPTION OF THE DRAWING

FIG. 1 is a schematic depiction of an example of flat file data storage;

FIG. 2 depicts a directory structure of a type usable in connection with the data storage depicted in FIG. 1;

FIGS. 4A–4F are schematic depictions of an example of data stored in tables of a relational database;

FIG. 5 depicts a directory structure of a type usable in connection with the data storage depicted in FIGS. 4A–4F;

FIG. 6 is a schematic depiction of an example of flat file data storage;

FIGS. 7A–7D are schematic depictions of data stored in tables of a relational database;

FIG. 8 is a block diagram of a system for information retrieval according to an embodiment of the present invention;

DETAILED DESCRIPTION OF THE PREFERRED EMBODIMENTS

Figure 3A:
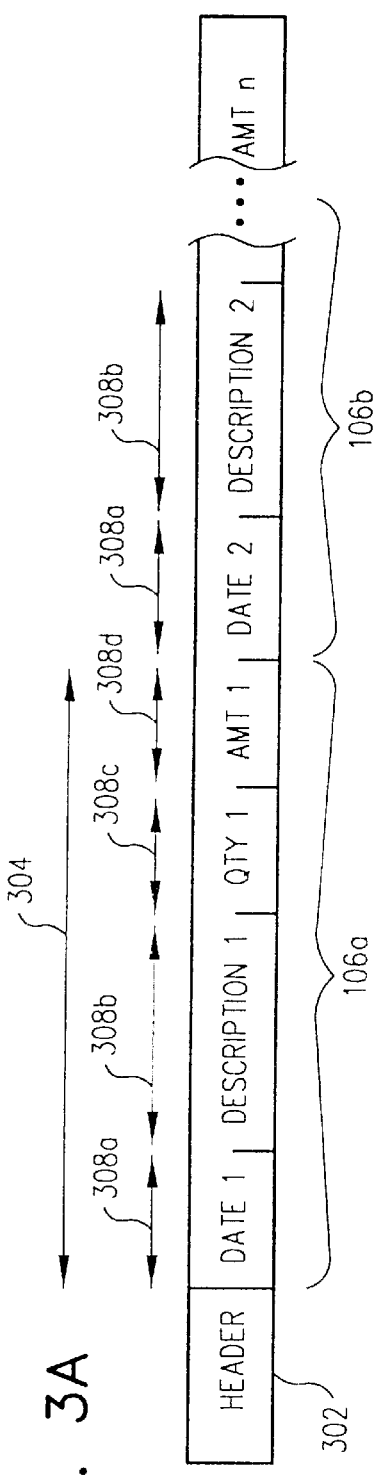
FIGS. 3A–3C depict examples of data storage formats usable in connection with the data storage depicted in FIG. 1.

Before describing certain aspects of the present invention, it will be useful to promote an understanding of the present invention, to provide examples of various fashions of storing information. This will be done by providing several examples, including examples of accounting information and examples of scientific or technical information. Table I provides a comparison of types of data that might be stored by two different corporations. Table I is intended to indicate the conceptual organization of accounting and other information for two corporations, and is not necessarily information that would be stored in a database (although it could be, if desired).

TABLE 1

| Examples of Accounting Organization | |
|---|---|
| Corporation #1 | Corporation #2 |
| Account | Account |
| Cash | Cash |
| Accounts Payable | Bank #1 |
| Accounts Receivable | Bank #2 |
| | Bank #3 |
| | Savings |
| | Checking |
| | Accounts Payable |
| | Parts |
| | Consultants |
| | Accounts Receivable |
| | Sales |
| | Interest |
| Employee | Employee |
| Salesman #1 | Sales |
| Salesman #2 | Salesman #1 |
| | Salesman #2 |
| | Research |
| | Researcher #1 |
| | Researcher #2 |

TABLE 1-continued

Examples of Accounting Organization

| Corporation #1 | Corporation #2 |
|---|---|
| Project | Project |
| Research | Research |
| Sales | Chemical |
|  | Biomedical |
|  | Sales |
|  | Old Products |
|  | New Lines |
| Product | Product |
| Product #1 | Old Product Lines |
| Product #2 | Line #1 |
|  | Product 1 |
|  | Product 2 |
|  | Line #2 |
|  | Product 3 |
|  | Product 4 |
|  | New Product Lines |
|  | Line #3 |
|  | Product 5 |
|  | Product 6 |
|  | Line #4 |
|  | Product 7 |
|  | Product 8 |
|  | Subsidiary |
|  | Subsidiary #1 |
|  | Subsidiary #2 |

In the first example of Table I, corporation no. 1 retains Account information, employee information, project information and product information and thus has four account parts. The Account information of corporation no. 1 includes only three components: cash, accounts payable, and accounts receivable. The corporation maintains a list of its salesmen, tracks information by two types of projects (research and sales) and maintains a list of its products. The second example of Table I is a somewhat lengthier (but still simplified) example. In this example, the Account has multiple components in a hierarchy. Although corporation no. 2's account has categories of cash, accounts payable and accounts receivable, each of these categories has subcategories and some of the subcategories have even finer divisions. Similarly, the employee, project and product information is broken into several categories and subcategories, and corporation no. 2 further has additional items which are tracked, such as subsidiary companies.

Table I illustrates that, even before considering differences among data sources and/or data storage formats, a corporation's structure and/or the manner in which it chooses to organize its information will cause differences from one system to another. For example, if an accountant had corporation no. 1 and corporation no. 2 as clients and wished to use a uniform or standard system of reporting and analysis or for these two corporations, there would be significant difficulties in doing so, even if corporation no. 1 and corporation no. 2 used the same database software, and even organized accounting information within that software in a similar fashion. Thus, using previous methods, it typically would have required human analysis and understanding of the information in Table I in order to provide uniform or standardized reporting and analysis for the two corporations, based on those corporations' databases.

Still in the context of considering accounting information, several types of information storage may be used for storing the accounting information of corporation no. 1 and/or corporation no. 2. For example, the information may be stored as one or more flat files. It is noted that, at least according to some usage. "flat file" information storage is not a true database system. Nevertheless, the present invention, in at least some embodiments, is able to accommodate flat file data, as well as other database and non-database storage methods.

FIG. 1 is a schematic depiction of how a plurality of flat files might be used co store information for corporation no. 2 of Table I. Although FIG. 1 shows the information as it might appear in written form on a plurality of sheets of paper, the data will, in fact, be stored on a computer readable medium such as a hard disk, e.g., as described below. The format of FIG. 1 is intended to depict the logical structure of the data organized into a plurality of files 101a through 101f, each file having file identification information 104, depicted in FIG. 1 as title or header information 104a, 104b and a plurality of records, depicted in FIG. 1 as lines of information 106a, 106b, 106c, each record having a plurality of fields (organized into columns 108a, 108b, 108c, 108d in the depiction of FIG. 1). Methods and apparatus for storing and accessing data to have or reflect the logical row and column structure depicted in FIG. 1 are well known to those of skill in the programming art. The present invention can be used in connection with a number of flat file information storage programs. Examples of such information storage programs include those sold under the tradenames, Simply Accounting™ and MAS-90™.

Figure 3B:
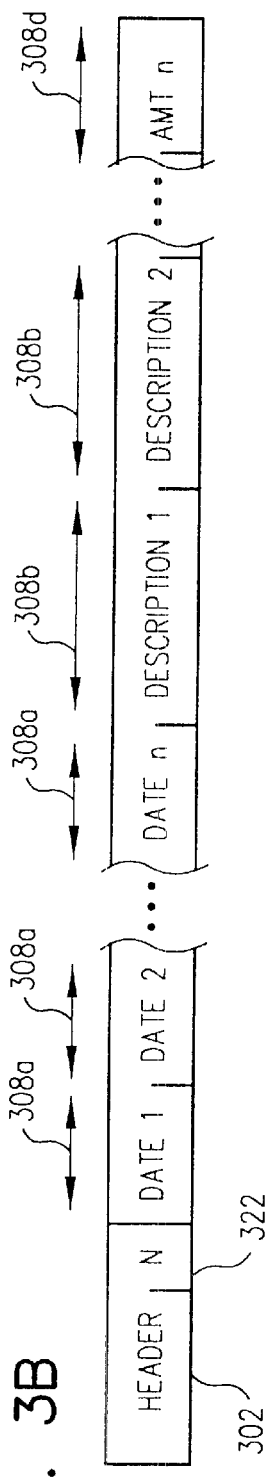
Figure 3C:
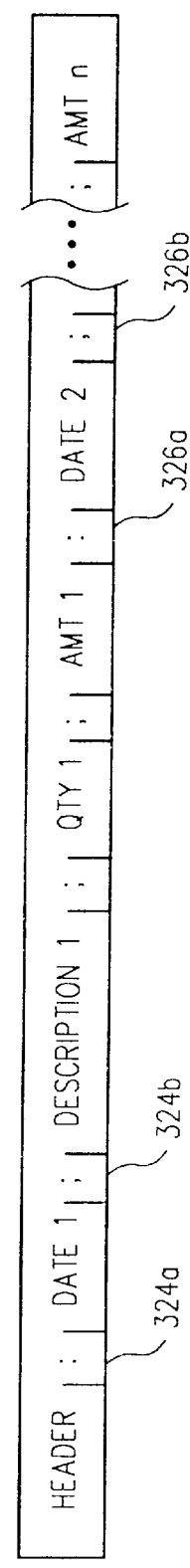

The data organized in the logical structure depicted in FIG. 1 may be stored in a number of different formats. For example, in one embodiment the data in each flat file 101a through 101f, is stored in a separate file on a hard disk of a personal computer. FIG. 2 depicts a directory/file structure which might be used for storing such files, in which all files depicted in FIG. 1 are stored in a single subdirectory. As is well known to those of skill in the art, the various files, even though organized in a directory hierarchy as depicted in FIG. 2, may be stored, physically, on a hard disk in a plurality of separated locations. A number of formats may be used for storing the data in a file. Examples are depicted in FIGS. 3A through 3C. In the example of FIG. 3A, the file includes header information, followed by storage of the first record 106a, the second record 106b, and so on. In the example of FIG. 3A, a fixed length data format is used in which each record 106a, 106b, has an identical length 304 (i.e., occupies a fixed number of bits). In the embodiment of FIG. 3A, each field within each record also has a fixed length 308a through 308d.

FIG. 3B depicts another fixed length data storage method in which data is stored in column order rather than row order (all dates sequentially, then all descriptions sequentially, etc.). In the embodiment of FIG. 3B, in order to assist in locating desired data, it may be useful to store an indication 322 of the number of records, e.g. as part of the header. In the fixed length system, e.g., as depicted in FIG. 3A or 3B, a particular piece of data will be located a given distance (i.e., a given number of bits) from the beginning of the data. For example, in FIG. 3A, if the header 302 is known to have a length of four bytes, and the record length 304 is known to be 8 bytes, the data information for the first record 106a will necessarily be found beginning at byte number 5, the data information with the second record 106b will necessarily be found beginning at byte number 13, and so forth.

FIG. 3C depicts storage of data in delimited fields rather than fixed-length fields. In delimited format, a special symbol, i.e. a pattern of bits which is different from any pattern used for storing data, is used to mark the end or beginning of a record and/or a field. In the embodiment depicted in FIG. 3C, two different special symbols are used, one to mark the beginning of a record and another to mark the beginning of a field. These symbols are indicated in FIG. 3C, respectively, as a colon and a semicolon, which may stand for any bit pattern or symbol. In the data format of FIG. 3C, it is possible to identify the information indicating the date information for the first record 106a as the information following the first new record symbol 324a, and prior to the first new field symbol 324b. The date information from the second record 106b would be that information following the second new record symbol 326a and preceding the next-following new field symbol 326b, etc. Many other formats for storing information are possible. It should be apparent from the illustrations of FIGS. 3A through 3C that the multiplicity of data storage formats presents yet another problem to access, coordination and combination of data in different types of information storage systems. Previously, those wishing to access information directly (e.g., without using the database management system or other software intended to read the stored information) required knowledge of the data storage formats such as might, in some cases, be acquired by analyzing examples of the stored information. Thus, accommodating the needs of an accountant who wishes to access information stored for both corporation no. 1 and corporation no. 2 of Table I would require not only information about the logical organization of the data (FIG. 1), its logical directory structure (FIG. 2), but also information about data storage format (FIGS. 3A through 3C).

In addition to storage of information as flat file data, a number of other possibilities exist. FIGS. 4A through 4F depict one possible organization of information in the context of a relational database. In the example of FIGS. 4A through 4F, a first transactions table 402 is stored, having a plurality of records 406a through 406d. It will be noted the records depicted in FIG. 4A are similar in some respects to those depicted in FIG. 1, i.e., include a data field, description field, quantity field, and amount field. In the example of FIG. 4A, an additional index field 408 is provided for each record. The transaction table in the example of FIG. 4A does not include the header information 104a of the type depicted in FIG. 1, and only a single transaction table FIG. 4A is provided (rather than a multiplicity of tables 101a through 101f in the embodiment of FIG. 1). In the relational database depicted in FIGS. 4A through 4F, additional tables are provided which may reflect the organization depicted in Table I. For example, an Account table 412 includes a list of all the categories defined in Table I, with an index 414 being associated with each account. Similarly, a employee table 416 includes the names of the employee of Table I, each having an index 418 associated therewith. Also in FIG. 4C is an indication, for each name, of whether the person is associated with the sales force or the research force (reflecting the hierarchy shown in Table I). Furthermore, a field is included to indicate the location of the employee. Additional tables (not depicted) may be provided to list the various projects, products and subsidiaries of corporation no. 2, reflecting the organization of Table I.

FIG. 4D depicts a link table 422, which indicates, for each record of a transaction table 402, any desired links to other tables. For example, if the first transaction 406a is a transaction relating to the bank no. 1 component of the cash account, a record 428 will be provided, indicating that for the transaction record having index value no. 1, the appropriate account reference is that having the index no. 424. Similarly, links may be made to the employee table 416, or other tables (not shown). Thus, whereas in FIG. 1 it was necessary to provide a separate file for each possible combination of account, subsidiary, product, project, etc. (potentially leading to a very large number of files for a relatively complicated accounting structure), only a single transaction table 402 is required in the embodiment of FIGS. 4A through 4F, with the link table FIG. 422 providing the information which, in the example of FIG. 1, is obtained by knowing in which flat file a transaction is stored.

In a typical relational database, it is possible to identify and display only information meeting certain criteria, e.g., only those transactions for a particular account and particular employee. In some database software it is possible to store such criteria or "queries" for use, e.g., when the selective information is commonly needed. FIG. 4E depicts a table which stores a plurality of such queries using, e.g., structured query language (SQL). The queries which are used in a particular database system may reflect the manner in which the data is analyzed or organized by a company. And thus, an accountant who may have an interest in standardizing reporting and analysis based on information in such a database may wish to know about and/or be able to reproduce the data analysis of the type represented by various stored queries (FIG. 4E).

Additionally, many types of database permit a user to design a report (either for display or printing) and, in some case, to store information defining such a report, e.g. for repeated use. Thus, another table or set of tables (not shown) may be stored as part of or in connection with a relational database to preserve information regarding such reports.

The information and structure represented in FIGS. 4A through 4F may be stored in a number of different fashions. FIG. 5 depicts a directory/file hierarchy which may be used for storing a plurality of data tables, link tables, query tables, and/or report formats. Such data may be stored in a number of different data formats, such as any of those depicted in FIGS. 3A through 3C, or others, as will be known to those with skill in the art.

Another example of information which may be stored in various formats is scientific or technical information. In FIG. 6, a flat file system is provided for storing surface temperature information for, e.g., meteorological research. In the example of FIG. 6, each file 602a, 602b, 602c stores information for a particular location and unit of measure (e.g., Fahrenheit or Celsius), indicated in the header thereof 604. For each record 606a, 606b, 606c the date and the reading for each hour of the day is stored in separate fields. A relational database system for storing this type of data is depicted in FIGS. 7A through 7D. A data table 702 contains all of the observations and, for each observation, unit of measure 704a, along with an index 704a. Tables 706 (FIG. 7B) and 708 (FIG. 7C) store information relating to location and hours of the day. Each line 722, 724 of the link table (FIG. 7D) can be used to indicate, for any data point stored in FIG. 7A (as indicated by its index value 704b), the index value for the location associated with that data point and the time of day associated with that data point. Although the examples of FIGS. 6 and 7A through 7D are simplified, it will be apparent to those of skill in the art how to construct information systems for storing more complicated sets of data such as meteorological data, including wind speed and wind direction, radio sound data, and the like. Thus, if a researcher wished to correlate information from two meteorological data sources, one of which stored information in the system depicted in FIG. 6 and another storing information in the system depicted in FIGS. 7A through 7D, in previous methods it would typically be necessary to have a consultant or other expert analyze the information storage structure and organization depicted in FIGS. 6 and 7A through 7D, and manually develop a system for accessing the information in such a fashion as to permit the combination or coordination of the data therein.

FIG. 8 is a block diagram of a system, according to one embodiment of the present invention, for use in overcoming the difficulties described above in relation to accessing, coordinating, or combining data on different information systems. In the embodiment of FIG. 8, a main process 802 selectively activates various drivers 804b, 804c, 804d, as needed in connection with analyzing and/or accessing information in a plurality of data sources 806a, 806b, 806c, 806d. For purposes of discussion, the source data 806a through 806d, depicted in FIG. 8, can be data which is stored or created by any of a number of programs or systems for organizing or storing data such as flat files systems, databases, spreadsheets, etc., as discussed above. The processes and data of FIG. 8 may reside on one or many computers. In one embodiment, the process is implemented in the context of a local-area network (LAN), having a network server computer, and associated disk or other storage devices, and one or more client computers. In one embodiment, the main process 802 is executed on a client computer while the information sources 806 and the data files for the new database 808 are stored on disk (or other data storage) associated with the network server. The invention can be implemented in many other architectures, such as on a single computer, on multiple non-networked computers, using computers which are linked by a communications link such as a wide area network, modem communications, via the Internet, etc. A number of types of computers can be used to implement the invention, including mainframe and personal computers such as those produced by International Business Machines (e.g. 386, 486 or Pentium® or Pentium Plus based computers), Apple Corp. (such as Macintosh computers) and clones of such computers. In one embodiment, the processes are implemented using a DOS operating system and/or a Microsoft® Windows or Windows 95 user interface.

The items referred to herein as drivers 804a through 804d, should not be confused with a data filter of a type provided in certain database programs. A data filter is, typically, a type of query or logical test for selecting certain records and/or fields, according to user determinable criteria. The drivers 804a through 804d, on the other hand, as described more thoroughly below, are processes having multiple functions for analyzing and accessing different types of source data. In one embodiment, the function modules 804 are provided as dynamic link libraries (DLLs) in a manner that will be understood by those of skill in the art after understanding the present disclosure. The drivers 804a through 804d are configured for operation with one or more types of data sources, such as a data file produced using a particular database program. Depending on the characteristics of the database program, it may be necessary to have, e.g., two separate drivers for data files produced by two separate versions of a database software package. In some circumstances it may be possible to provide a single driver which can be used in connection with data files produced using two (or more) different types or brands of software (or different versions of a given brand of database or other software).

The source data 806a through 806d depicted in FIG. 8 may, in general, be any computer readable information source. Examples include flat file source data, hierarchical databases, relational databases, spreadsheets, and the like. Although FIG. 8 depicts an embodiment in which four data sources are shown, the present invention could be used in context in which there was only a single data source, or in which there were five or more data sources. Although the present invention may be used in situations in which each data source 806a through 806d is produced using a different type or brand of software, it is also possible to use the present invention in situations in which two or more of the data sources are produced by the same brand or type of database or other software. As one example, the first driver 804a might be configured for use in retrieving information from data files that were produced using dBase III®, the second driver might be configured for use in retrieving information from data files that were produced using dBaseIII®, the third driver might be configured for use in retrieving information from data files that were produced using a flat-file system such as Simply Accounting™ and the fourth driver might be configured for use in retrieving information from data files that were produced using Microsoft Access®.

Once the data source or sources have been analyzed (as described more thoroughly below), the results of such analysis can be used in a number of ways, including providing for user-access to the information in the data sources for viewing or editing, copying some or all of the data and, preferably enhancements thereof (as described below) to create a new database, creating data reports (for viewing, printing, storage, transmission, etc.), queries and the like.

In the embodiment of FIG. 8, after the main process 802, using the drivers 804, performs an analysis of the source data 806a through 806d, it may create one or more new databases 808, containing data from one or more of the various data sources 806a through 806d. In one embodiment, one new database is created for each data source. It may be desired to join two or more such databases, e.g. using standard database techniques, such as when such databases have similar structure. In another embodiment, one database 808 may contain information from two or more data sources (e.g. if a company uses one database or other data source for storing sales information and another database or other data source for storing employee information). In at least some embodiments, some amount of preparation or reformatting or other processing of the source data is preferably performed in connection with creating a new database 808. Although in one embodiment, all such processing is handled by the appropriate driver(s), in other embodiments some such processing may be handled with in the data source 806 and/or in the new database 808. In one embodiment, after data has been prepared or processed in this fashion, it can be used in connection with populating the new database 808, by employing a universal routine, i.e. a routine which can operate in connection with any of a plurality of different data sources.

The new database or databases 808 may, if desired, be used for generating reports, e.g., using a report writer 810, and may, if desired, be used for entering, viewing or analyzing data, e.g., using a database management system 812 or other software 814. In one embodiment, the database 808 is a Microsoft® Access database which includes base code having one or more wizards, templates, filters and or tool kit software (as those terms are understood by those skilled in Microsoft® Access programming) e.g. for providing database reporting and analysis such as outputting standard financial reports. In one embodiment, financial and management reporting software is provided as an extension or modification of that available under the tradename METAVIEW™ available from Timeline, Inc. of Bellevue, Wash.

In one embodiment the information in the new database or databases 808 is enhanced, e.g. by main process 802 in the sense that it is configured to generate, display or output analysis or relationships of data which were not displayed or output by or using the source data 806a through 806d.

Figure 13:
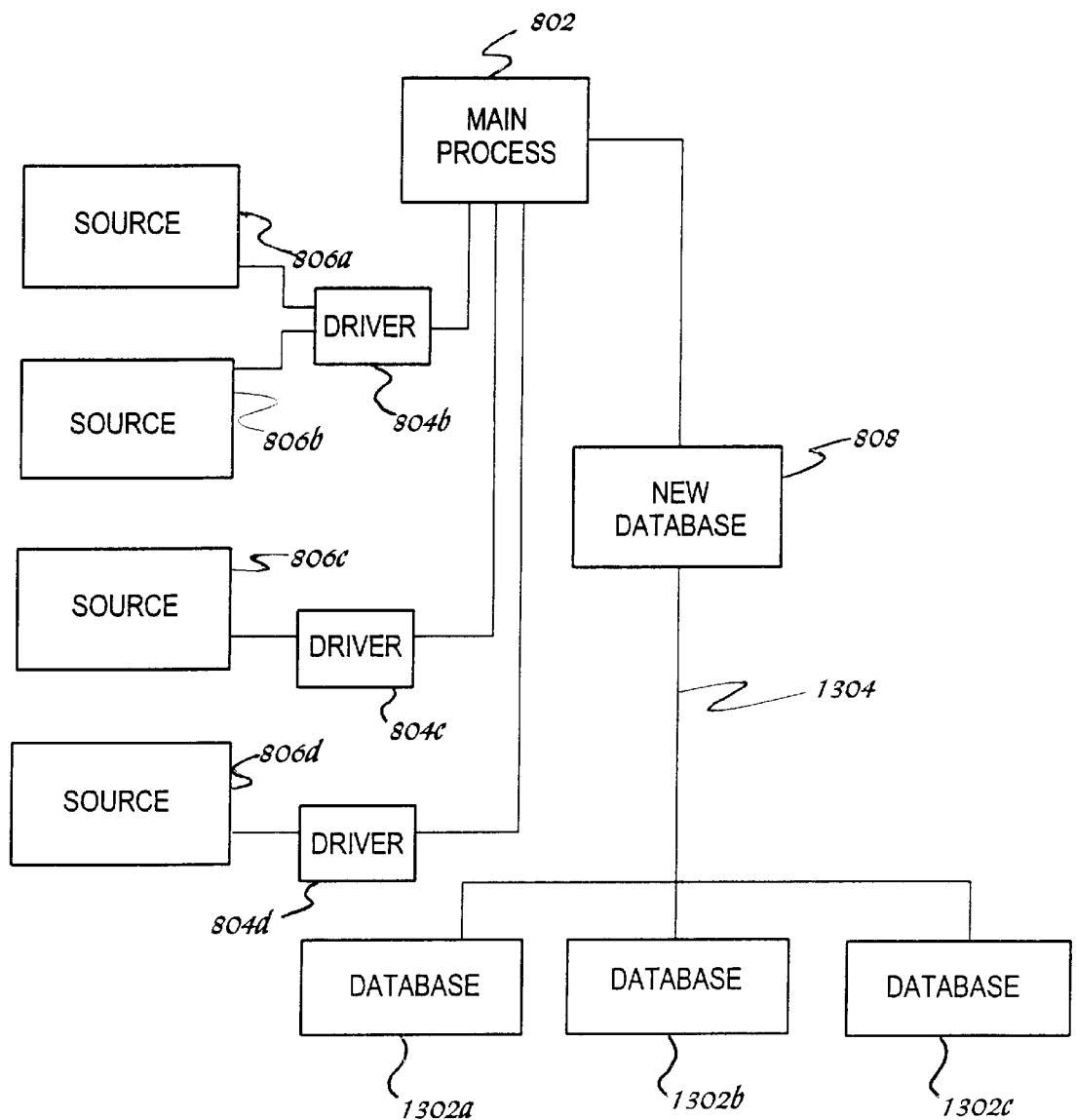
FIG. 13 is a block diagram of a system for information retrieval according to an embodiment of the present invention.

As depicted in FIG. 13, in one embodiment, new database 808 is only one of many databases which are formed. In the depicted embodiment, a plurality of databases 1302a–1302c are provided by using the new database 808 as an information source for distributing databases 1302a–1302c to information end-users. Each of the databases 1302a–1302c are populated with at least some information from the database 808. In one embodiment, the databases 1302a–1302c can differ from one another, e.g. by having different data and/or different database structures, reports, queries, and the like. As one example, when database 808 contains information pertinent to a plurality of different companies (e.g. different subsidiary companies of a parent company), each of the databases 1302a–1302b might contain information for use by one of the companies and would then typically contain only information related to that company. Since different subsidiary companies might be organized differently, each may have its own pre-defined reports or other structure. It is also possible that one or more of the databases 1302a–1302c might contain information related to two or more of the subsidiary companies, such as accounting information, summarizing activity for all (or groups of selected) subsidiaries, e.g. for use by the parent company. The databases 1302a–1302c may originate from a so-called push procedure (from a series of commands originating from the computing system where the new database 808 resides) and/or from a so-called pull procedure (from a series of commands originating from the computing systems where the databases 1302a–1302c reside. Each database 1302a–3102c may be built as a result of querying the database 808, selecting the structure and data to include in the database 1302a–1302c, as will be clear to those of skill in the art after understanding the present disclosure.

In one embodiment, databases 1302a–1302c can be used in the normal fashion by the end-user(s) of each database which typically will involve adding or updating information in the databases 1302a–1302c. Preferably, such new or updated information is also written-back, preferably in a fully or partially automatic fashion, to the database 808. In this way, others who access the database 808, or who access another database 1302a–c which may contain information which relates to that which has been added-to or updated(for example, the parent company) will receive up-to-date data. Write-back to the database 808 can occur periodically, on request, or can be performed each time any of the connected databases 1302a–1302c is updated. In some cases changes made to the databases 1302a–1302c are best handled by changing some of the structure of database 808 (such as adding new tables, new Fields, new indices, new reports or the like). Preferably, the advisability of changing some structure of database 808 is detected at least partially automatically, such as by comparing the present structure of database 808 with structure-defining information automatically detected in the databases 1302a–1302c, e.g. using techniques similar to those described above in connection with detecting structure-defining information of data sources 806.

In one embodiment, some or all of the databases 1302a–1302c are configured with the queries, reports and similar structures but at least some or all of the data being permanently stored in the database 808. For example, in one embodiment, a database 1302a may have certain queries defined, but when a query is executed, a communications link 1304 is used so that the query is executed on data residing in database 808. In one embodiment, the information which results from execution of the query is cached in a memory or data storage device, either at the site of database 808 or the site of the requesting database 1302. If desired, such caching can be performed only when at least a threshold number of requests for the same query have been received. Regardless of whether a threshold is implemented, the memory or storage available for caching can be recycled, e.g. on a least-recently-used basis, as will be understood by those of skill in the art after understanding the present disclosure. Preferably before cached data is supplied in response to a query or other request, a check is performed to determine if there have been relevant changes to the data (i.e. whether the cached data would be identical to a response resulting from execution of the query on the most up-to-date data available). Such a check should be performed with respect to each potential source of data changes/updates. When the system is configured such that database 808 can be directly accessed, database 808 should be checked to determine if there have been any directly-made changes that would affect the cached data. One manner of performing such checking is to store, in addition to the cached data itself, an identification of certain data categories (e.g an identification of tables, fields, and the like) that were used in providing the cached data. Each time a change is made in database 808, it is determined whether any of the tables, fields, etc. used for the cached data is being changed. If so, the cached data associated with such tables, fields is marked (e.g. by setting a data flag) to indicate the cached data may no longer be up-to-date and, preferably, the memory or storage used for such cached data is released for recycling (i.e. for storage of a response to another query or request).

When the system is configured for write-back of data from the databases 1302a–c to database 808, then, before cached data is provided, it should be determined whether there have been changes made in databases 1302a–c (e.g. changes to stored queries), not yet reflected in the database 808, which would make the cached data out-of-date. Similarly, when the system is configured such that changes may be made to data sources 806, that may not have been reflected in updates to the database 808, a check should be made for changes that could affect the up-to-date nature of the cached data, before such cached data is provided in response to a request. In some cases multiple checks should be performed (checks of changes to databases 808, 1302a–c and data sources 806) before cached data is provided in response to a request.

Figures 9, 11A, 11B:
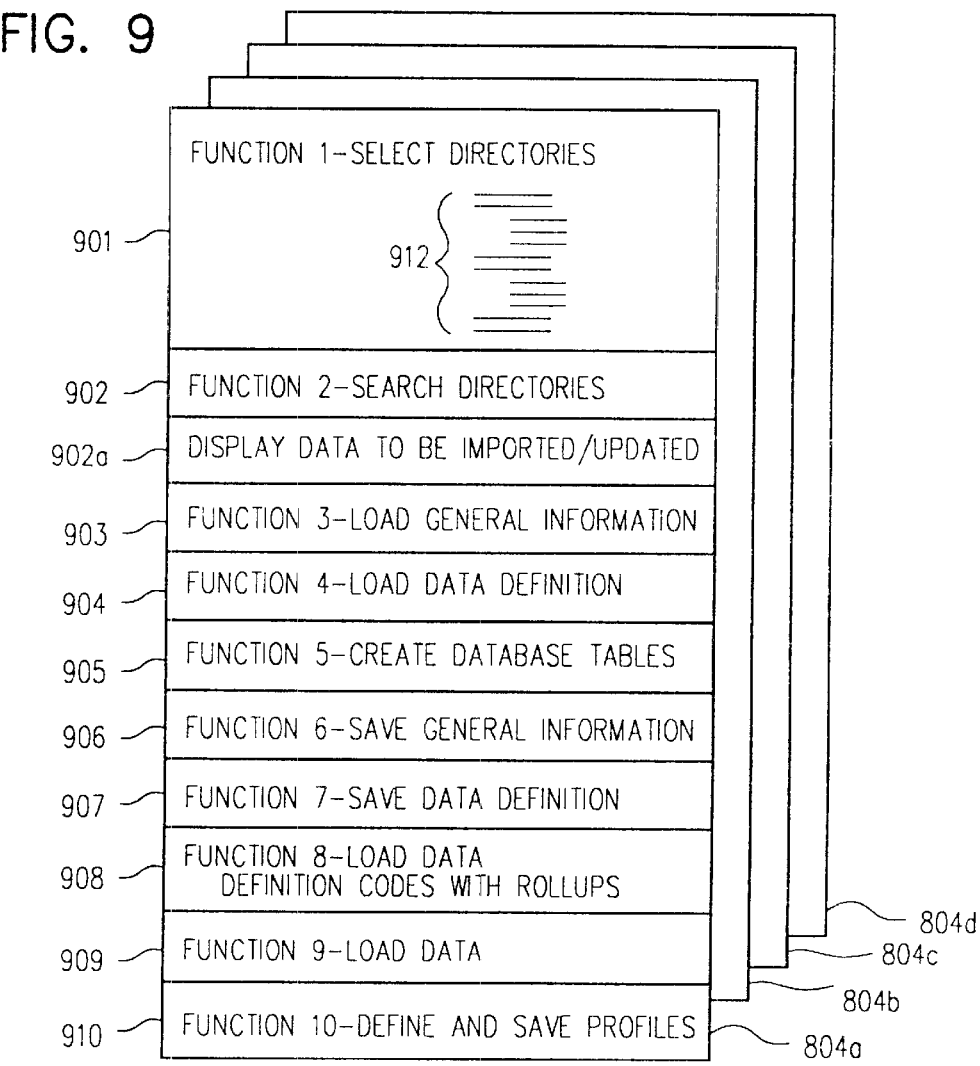
FIG. 9 is a schematic depiction of the contents of a function module according to an embodiment of the present invention.
FIGS. 11A and 11B depict pseudocode procedures for selecting or searching directories, according to an embodiment of the present invention.

FIG. 9 is a schematic depiction of various drivers 804a through 804d. Each driver includes a plurality of defined processes or functions 901 through 910. Each function may include computer program instructions 912, e.g., to implement and carry out one or more of the steps described below and depicted in FIG. 10. In one embodiment, each function 901–910 is a callable subroutine or procedure. The functions 901 through 909 defined in a given driver 804b include functions which must be performed or carried out differently depending on the type of source data 806a, 806b. Thus, for example, with regard to function one 901, which is a function designed to select certain directories on a hard disk or other information storage device where desired information is stored, the procedure for selecting directories will differ depending on the type of source data 806, as can be seen, e.g., from a comparison of the example of FIG. 2 with the example of FIG. 5. Accordingly, the programming 912 which implements function one in the first driver 804a may be different from the programming code which implements a corresponding function in the second driver 804b. In this way, each driver defines one or more processes for performing a function with such procedure being configured to accommodate the different characteristics of two or more different types of source data. For example, FIG. 11A depicts a portion of a procedure, expressed in pseudo-code, of a type which might be used in connection with selecting and/or searching directories in connection with the directory structure depicted in FIG. 2, while FIG. 11B shows corresponding portions of pseudo-code for a procedure which might be used in connection with selecting or searching directories for the directory structure depicted in FIG. 5. Those with skill in the art will understand, from the examples of FIGS. 11A and 11B, how to configure drivers to perform the same function on two different types of source data. Although FIG. 9 depicts a function module having nine functions, the present invention could be used in connection with a function module having more or fewer functions. It is possible to configure a system in which different function modules define different numbers of functions and/or in which one or more functions are configured to provide or return a null value or a constant value or information.

Figure 10:
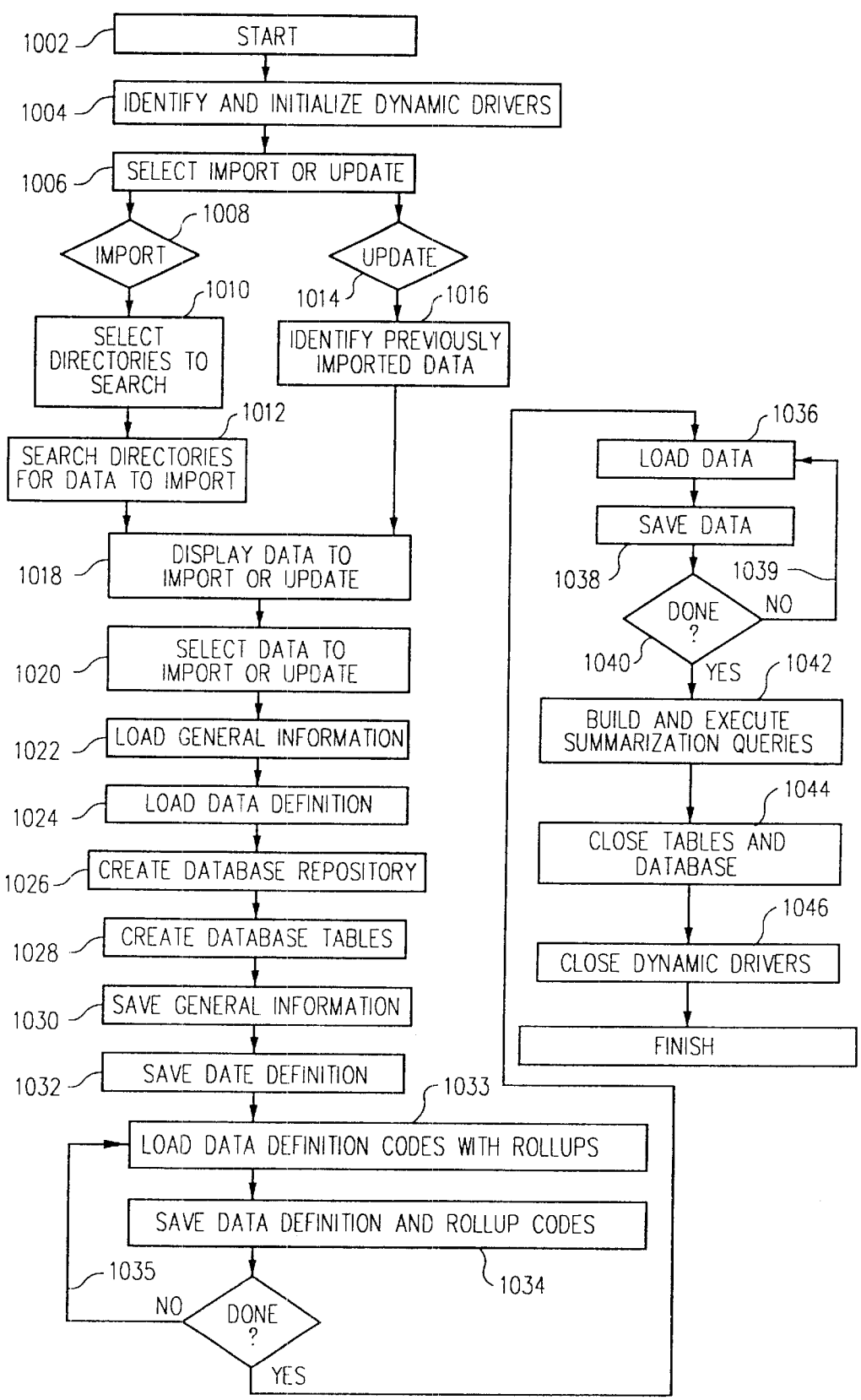
FIG. 10 is a flowchart of a process for information retrieval according to an embodiment of the present invention.

A number of procedures can be used to start 1002 the method which is depicted in FIG. 10. In one embodiment, the method of FIG. 10 is implemented using a computer program stored on a medium such as a hard disk, CD-ROM or other non-volatile medium, and the method is started by issuing instructions to the computer (e.g. via a keyboard, mouse, etc.) to launch the program, i.e., to load the program into memory and execute the program. Alternatively, the program may be launched by another program. For example, in one embodiment, the database new database 808 is a Microsoft® Access Database which can include a routine, such as a so-called "wizard," for launching the program, with the program (FIG. 10), in turn, accessing data in the information sources 806 to populate or update the database 808. In this embodiment, it may be useful to employ the wizard to display prompts or "dialog boxes" for the purpose of soliciting user input as needed (e.g. for step 1020), so that the user interface will have an appearance which is consistent with the user interface for the database 808. Thus, it can be seen that even though a process as described herein is partially or fully automatic, and/or even though a process can be performed without the need for user input, nevertheless, it may be desired to provide for user input for various purposes, e.g. to provide options for reducing processing time, for eliminating or selecting default or optional features, and the like.

In the procedure depicted in FIG. 10, the first step after the procedure starts 1002 is to identify and initialize the dynamic drivers 1004. In this context, the drivers 804 are considered to be dynamic in the sense that drivers can be modularly added or deleted, e.g., to accommodate a new or different type of data source. For example, a user may initially be provided with a system such as that depicted in FIG. 8 having four drivers, but may at some future time add additional drivers through purchase from a software vendor, downloading from an information service, network, Internet connection and the like, or by writing a custom driver. Because of the modular and dynamic nature of the drivers, it will not be known, in advance, which drivers are available, and thus, when the program is started 1002, the program identifies the drivers that are available to it. In one embodiment, this is performed by searching a disk or a directory thereof for files having a predetermined (partial) file name or file extension. In one embodiment, the program may further analyze selected portions of each file, e.g., header information, to verify that files identified by such file name and/or extension are desired drivers. Initializing the drivers generally includes identifying and linking the driver functions and initializing data within each driver.

It is then determined whether the procedure will perform an import or an update 1006. In an import, a procedure is first done in which all or a majority of the data and structure in the data source is accessed and saved to the new databases. In an update, a procedure is done in which only a selected portion of the data and/or structure are accessed, e.g., to assure that the information in new databases 808 reflects recent changes or additions that may have been made to the data source 806. In a typical situation, an import will be performed the first time the system of FIG. 8 accesses or uses information from a given data source, or if relatively major changes or additions have been made to the data source. Typically, an update will be performed on a regular basis (e.g., daily, weekly, etc.) In order to synchronize the data in the source data 806 with the data in the new databases 808. In one embodiment, the selection to import or update 1006 is performed automatically, i.e., by performing an update unless this is the first time the procedure has accessed the particular data source. In another embodiment, a user is permitted to choose between import and update by providing input, e.g., via a keyboard selection, using a pointer device, and the like.

If an import has been selected 1008, the main procedure 802 will initiate the execution of a function of one or more of the drivers to select directories to search 1010. The driver 804 which is loaded or called by the main process 802 will depend on which type of source data is being accessed. In particular, for a given data source 806a, the main process 802 will employ the driver 804b, which is configured to accommodate that type of source data 806a. If more than one data source 806 is to be accessed, the main process 802 will use whichever driver 804 is configured for each type of sour data 806. Preferably, the type of the data source is determined automatically based on characteristics such as the names (or "extensions") of the files and/or directories, the number, size and structure of the files, header or other information in the files. In another embodiment, a user is permitted or requested to indicate the type of data source (e.g. by identifying the brand name and version number of the software that was used to create the data source files or by indicating whether the user wishes the procedure to search only local disk files or to perform a search that includes network files).

In one embodiment, a driver (or driver subroutines or parameters) are selected depending on the language used in the source data 806. For example in order to properly determine the type of the data source when such determination depends, partially, on a filename, or file header information, such name or information may take a different form (even for the same brand of source data program) depending on whether the source data is installed for use by a speaker of English, Spanish, Japanese, etc. Accordingly, in one embodiment, different drivers are used for the same type of data source which is installed for speakers of different languages. Alternatively, it is possible to use substantially similar driver(s) for different-language data sources but to configure the driver(s) to obtain sought-for filenames or the like in appropriate language(s) e.g. from a table, from passed parameters or the like. In this way the drivers can analyze databases in any of a plurality of languages. Although one embodiment provides such language capability substantially automatically, it is also possible to configure drivers to permit (or to require) user input specifying one or more languages of the source data.

In addition, when new database 808 is built, it can be built using a language (e.g. for names of fields, captions titles and the like in the database 808 output) which is the same as, or is different from, the language(s) in which the data source(s) 806 is installed, e.g. using a table which provides corresponding field names, captions, titles and the like in a plurality of different languages. Such a can figuration can be used, e.g., to use a database or other data source created or installed for use in a first language, for at least partially automatically create or include databases 808 which are localized for different languages. This gives end-users the capability of employing the end-user's native language to query a foreign language database. For example an end-user can force a local-language database 808 to update itself (if needed), based on information in a foreign-language data source 806, by submitting a native-language query or report request to the local-language database 808. Similarly, databases 1302a–c (FIG. 13) may be configured with field names, identifiers, titles, captions and the like in different languages, but each having access to the same raw data by accessing or updating from database 808, to display requested data in a report using the home currency and/or with home language identifiers.

At the end of step 1010, the main process 802 will have access to a stored list of the directories which are to be searched for all data sources 806 as identified by drivers 804 which were identified in step 1004. After step 10 main process 802 loads or activates or calls another function 902 of the function modules 804a through 804d, in order to search the directories which were selected in step 1010 for the data which is to be imported 1012. The search of directories 1012 is performed in a manner which will depend on how the information is stored in different data sources 806. For example, for some types of source data it may be sufficient to identify files having a certain file name and/or certain file extension. For other types of source data 806 it may be necessary to scan the data in various files to identify files which have certain structures or contents, e.g., in a header portion of a file, or elsewhere. Thus, different modules 804 will be configured to provide the "search directories" function 902 in different manners, to accommodate different data sources 806.

If an update 1014 rather than an import 1008 is to be performed, it is not necessary to select and search directories, since, preferably, when an import is initially performed, the results of the functions 901, 902 for selecting and searching directories are stored in a manner which can be accessed by the main process 802 at a later time. Thus, using such stored information the main process 802 is able to identify data which was previously imported or updated. In one embodiment, this is useful to prevent loading of redundant data, i.e., data which is already present in the new databases 808. In general, it is desired at step 1016 to identify data which is new or changed since the last import or update such that at least some data already in the databases 808 will not be re-loaded. In one embodiment, in order to prevent redundant data loads, the system will attempt to identify data which has not changed since the last import or update. In general, if this procedure is followed, at the end of the procedure the data in the new databases 808 will be synchronized with the information in the source data 806, i.e., it will contain information which accurately indicates the structure and data of the data sources 806 in their current state.

In the embodiment of FIG. 10, an identification of the data which is to be imported or updated is displayed 1018 in order to give the user an opportunity to select the data to be imported or updated or to choose to refrain from importing or updating certain data. The manner in which the indication of data to be updated or imported is organized for display will depend on what type of data source is being accessed, and thus will be provided in response to a call or activation of a function in one of the drivers 804 (902a). For example, a function 902a of a driver which is configured for use in connection with the data source depicted in FIGS. 4A through 4F might display a list of the subsidiary companies drawn from table 430 (FIG. 4F) in order to give the user an opportunity to import or update data for some companies but not for others. Preferably, the user may select one or more companies from a displayed list. The display and selection steps 1018, 1020 can be repeated for other types of organizations or data in the data source, e.g., to display and permit selection of data specific to certain employee 416, to certain accounts 412, depending on how the display function 902a of the driver is written or configured. In some cases, it may be determined beforehand that it is desired to always import or update all available information from the data source, and thus the function 902a for the applied driver can merely return program flow to the main process 802. For example, with respect to the data source depicted in FIGS. 7A through 7D, it may be determined that all available surface temperature data from all sites are to be always included in every import or update. In one embodiment, the user may be provided with a display indicating the location of the data which corresponds to the user's selection, such as a display of the directories, sub-directories and files containing the information, and may optionally be given an opportunity to select which directories, files, etc. are to be accessed.

Once it has been determined, e.g., by steps 1018 and 1020, the data which is to be imported or updated, general information is loaded 1022. If it is desired to access information from two or more data sources, this can be done either serially (i.e., performing steps 1022 through 1046 on a first data source using a first module, followed by performing steps 1022 through 1046 on a second data source using the appropriate driver, and so on) or in parallel (i.e., performing steps on each desired data source using the appropriate drivers before performing later steps on each information module).

General information includes information about the structure of the data in the data source. The type of general information which is loaded in this step 1022 will vary for various types of source data. For example, for a function 903 which is written or configured for use in connection with a database such as that depicted in FIGS. 4A through 4F, the general information may include, e.g. an identification of accounts or other categories used in the data source 806. On the other hand, if the function 903 of a driver 804 is configured or written for use in connection with the data source depicted in FIG. 1, it may still be desired to determine how many components are used in the data source but, in this case, this information will be determined by the number of flat files 101a through 101f found in the data source 806. General information may also include information such as how many projects 112, how many products 114 and/or product lines 116, or how many subsidiaries 118, are defined in the data source 806. General information can also include company name, first month of the fiscal year and, in general, any other information that can be loaded once (as opposed to, e.g. information loaded in steps 1024, 1033 and 1036, typically loaded in a loop). If a "load general information" function 903 is provided in a driver configured for use in connection with the data source depicted in FIG. 6, general information such as the number of locations 612 in the database might be loaded in step 1022.

The main procedure 802 also calls or activates a function 904 of the appropriate driver or modules 804 to load data definitions 1024. Data definition can include information such as the text name stored as an identifier for a particular class or category of data in the data source 806, the field size, type of data (string, integer or decimal; number of decimal places) and similar characteristics for various categories of data. Preferably, loading of the data definition includes interrogation of the data to obtain information necessary to store an indication of the architecture or structure of the information in the data source and the data elements in the data source as required to generate one or more new databases 808 which will contain all of the structure and data needed for the type of reporting or analysis to be performed on the new database. The interrogation of the data in the "load data definition" step is intelligent interrogation in the sense that it can conform to virtually any data source and identify what is required to store a standard form of the data source, e.g. for reporting and analysis. In the example of FIGS. 4A through 4F, information needed to indicate the architecture of the source data would include, e.g., the names of the four account parts (Account, Company, Employee and Location) as well as the data type (e.g. numeric or string) and length required to store any string account parts. In the example of FIG. 6, information needed to indicate the architecture of that data source would include storing the names of the account parts (Location and Date) as well as the names of the references used for this data (Unit). Interrogation may include identifying other optional data that can be loaded, e.g. invoice numbers. The particular type of interrogation performed will depend on the characteristics of the particular data source being analyzed and thus is different for each driver 804. In general, steps of loading data or information 1022, 1024, 1033, 1036 are performed by functions in drivers 804, while steps of saving information 1026, 1028, 1030, 1032, 1034, 1038 are performed by the main process 802.

The main process 802 then identifies or creates a database repository 1026, i.e., identifies or creates a file or other data storage structure in the new databases 808 which will serve as the location where information loaded from the data source or sources 806 will be saved. An update typically does not need to create a new database or database tables, since updates usually simply add to already-existing tables within an already-existing database.

In one embodiment, the new database(s) have a pre-defined structure and, accordingly, in this embodiment, it is not necessary to create or define a structure for the new database, or to obtain information from the data source(s) for the purpose of defining such structure. However, it is anticipated that, commonly, not all possible tables or other data repositories of the pre-defined database would be filled with data from a data source. For example, the pre-defined database may have a table for holding company division information, while the data source may relate to a company which does not have company divisions. Thus in this embodiment, the driver(s) are preferably configured to determine which data from the data source(s) should appropriately be loaded into which tables (or other data structures) of the pre-defined database, depending, e.g. on what data is available in the data source(s).

When database 808 tables are not yet created, the main procedure 802 then calls the appropriate function 905 of one or more drivers to create database tables 1028 which will be used for storing data saved from the source data into the new databases 808. The manner in which the database tables are created preferably takes into account both the structure of the data and the data source or sources 806 and the manner in which the new databases 808 will be used, e.g., for analysis, generating reports, etc. Because the particular tables which are created will vary depending on the characteristics of the information in the data source 806 (as determined, e.g., by steps 1022 and 1024), the create database tables 1028 are functions provided by drivers 804 configured for the particular database being used for access. For example, when the "create database table" function 905 is written or configured for use in connection with an data source such as that depicted in FIGS. 4A through 4F, the database tables which are created may include, e.g., an Account table, a employee table, a subsidiary table (which may be a roll up of Account), and a details table (as described more thoroughly below), whereas a "create database table" function written or provided in a driver configured for use in connection with the database depicted in FIGS. 7A through 7D may include a location table, a date table, a time table, a unit table and a detail table.

Although the structure and the data for the new database (s) 808 may depend, at least in part on what information is available in the data source(s) 806, it is also possible to configure the system such that the structure and/or data to be loaded into the new database 808 may be at least partially specified or selected (manually or automatically) from among a plurality of choices. For example the system may be configured such that the user may specify or select (or the system may, by default, automatically configure itself) a general ledger database structure for the new database 808. In one embodiment, the system is configured to recognize certain commonly-used terms (e.g. "Net income") and to use drivers which, for each different type of data source, automatically maps such commonly-used terms to definitions, subroutines commands or the like which obtain the data (and, as needed perform calculations) required, in the context of the type of data source for which the driver is configured, to provide "net income" information in the new database 808. In a multi-data source environment, this allows the user to use the same requests to obtain corresponding numbers from each source, without, e.g. having to have knowledge of the underlying data sources 806 or their structures, commands, etc. In this say one or more queries requests or specifications by a user, preferably stated in semantic or "natural" language. can cause the appropriate drivers to build the desired new database 808.

Figure 12:
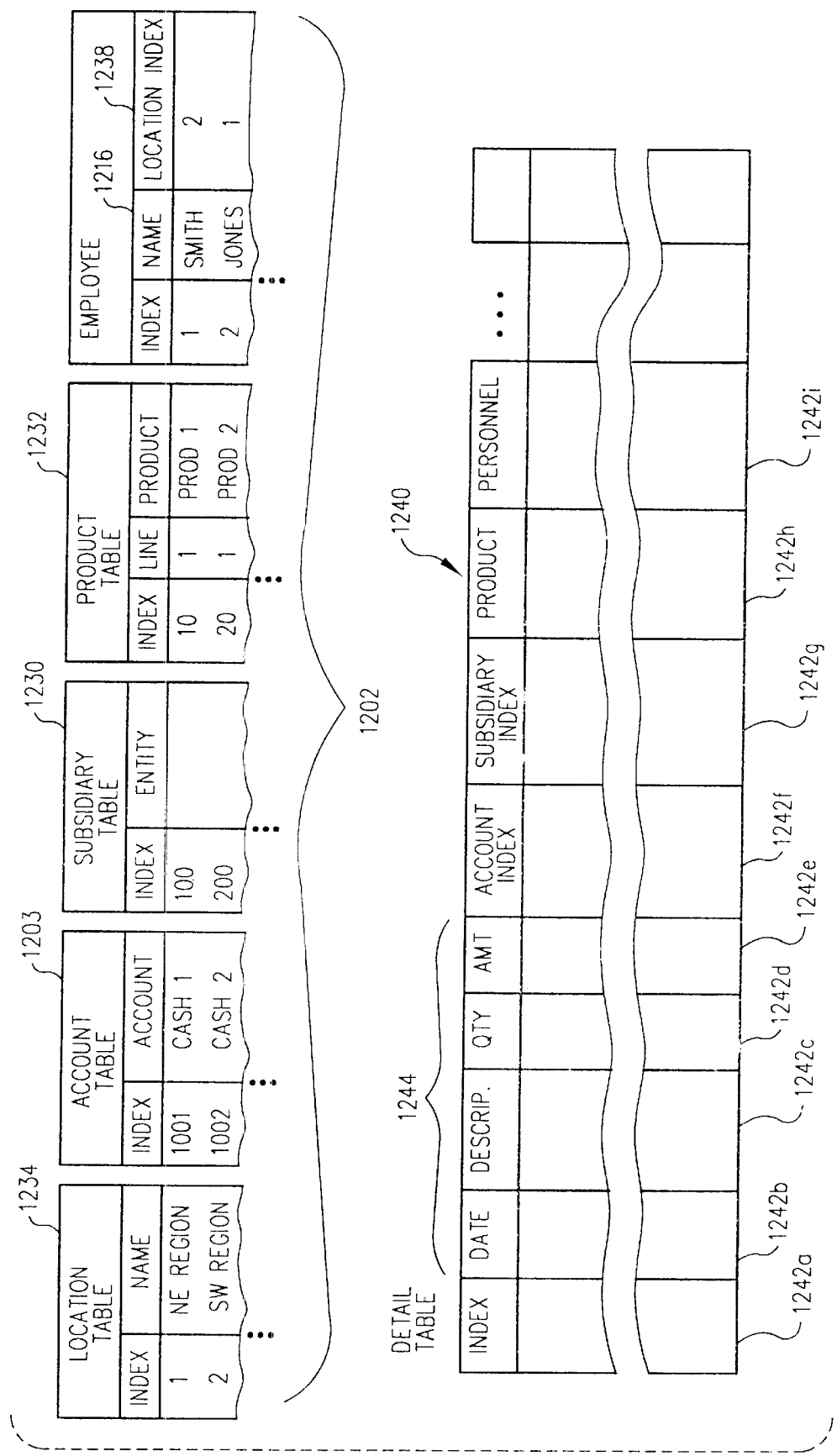
FIG. 12 is a schematic depiction of data stored in tables of a database 808 provided according to an embodiment of the present invention.

Preferably, the tables created in the new databases 808 have a structure or architecture which is dynamic in the sense that it can accommodate virtually any type of data definition or structure which might be found in various data sources 806. In one embodiment, the new databases 808 are intended to be used primarily for outputting information such as generating reports and analysis and thus are preferably configured, as described below, to provide superior output performance such as high flexibility in the types of outputs and data analysis available and relatively rapid execution of such analysis and/or output. In this context a database is optimized for speed and/or flexibility of output if it provides speed or flexibility of output which is superior to the speed or flexibility of some other possible configuration. Thus, in this context, "optimized" does not necessarily require a mathematically precise optimization. In one embodiment, three general types of tables are provided in step 1028: a plurality of category tables (including rollup tables where appropriate), at least one detail table and at least one entry table. Preferably, a category table is provided for each manner in which a particular data point or record can be categorized. For example, if the "create database table" function 905 is provided in a driver 804 which is configured for use with the database as depicted in FIGS. 4A through 4F, the new database, as depicted in FIG. 12, will contain a plurality of category tables 1202 including, e.g., an Account table which lists all the possible account categories of account 1203, a subsidiary table 1230 which lists all the possible subsidiaries found in the data source 806, a product table 1232 which lists all of the products noted in the data source 806, a employee table 1216 which lists all the employee noted in the data source 806, and a location table 1234 listing various locations, sales regions, etc., noted in the data source 806. In the depicted embodiment, each record or item in each of the category tables 1202 is associated with an index for use in a detail table as described below.

In the embodiment depicted in FIG. 12, the detail table 1240 will be provided that will, once populated, have a record for each accounting entry or transaction in the data source or sources 806. In the embodiment of FIG. 12 for fields 1244, namely a date field 1242*b*, description field 1242*c*, quantity field 1242*d*, and amount field 1242*e* are provided corresponding to a transaction in the data source (FIG. 4A). An index field 1242*a* is provided for storing an identifier number or index number for each record. Additionally, for each record a separate field is provided for storing an indication of any appropriate information for each of the categories defined in the load general information step 1022, in the example of FIG. 12, including the Account category 1242*f*, the subsidiary category 1242*g*, the product category 1242*h*, and the employee category 1242*i*. In general, it is desired to provide as many different fields, i.e., categories, which are present in the data source 806 as are needed for analyzing or outputting data. Thus, since it might be desired to output a report which groups the transactions according to which Account the transaction relates to, it is useful to have an Account category. Further, it might be that in the desired accounting purpose, it is desired to print out a separate report for each subsidiary or to print out a report in which transactions are grouped by subsidiary, thus it is useful to have a subsidiary category 1242*g*. In general, for each desired way of selecting, grouping, reporting, printing or analyzing the data, a separate field may be provided in the detail table 1240.

The structure of the database depicted in FIG. 12 may be contrasted with the structure of the data source depicted in FIGS. 4A through 4F and the structure of the data source depicted in FIG. 1. For example, in the structure depicted in FIGS. 4A through 4F, the manner in which a particular transaction (FIG. 4A) was associated with a particular account (FIG. 4B) was indicated in a separate link table (FIG. 4D), whereas in the embodiment of FIG. 12 the index for the appropriate account 1242*f* will be stored in its own field of the same record which contains the transaction information 1244. Thus, although the database 808 having tables as.depicted in FIG. 12 can store the information found in either an data source as depicted in FIG. 1 or an data source as depicted in FIGS. 4A through 4F (or source data structured in other ways), the structure or architecture of the database in the example of FIG. 12 is different from that of either the data source depicted in FIG. 1 or the data source depicted in FIGS. 4A through 4F. Similarly, the relational database structure of FIG. 12 is different from the flat file structure depicted in FIG. 1 even though the type of information stored in the two organizations is similar.

The main procedure 802 can be configured to save the general information 1030 (loaded in step 1022) and save the data definition 1032 (loaded in step 1024), e.g., in additional tables provided in the databases 808, e.g., for use in later steps of FIG. 10 and/or in updates performed at a later time.

The main procedure 802 uses appropriate functions 908 of one or more drivers 804, to load into the new databases 808, data definition codes (e.g., field width, data type, etc.) for the various tables created in step 1028 (1033). In one embodiment, rollup information is also loaded at this time. In general, rollup information refers to information used for defining sub-categories of data, i.e., groups of items within one of the category tables. As an example, as depicted in FIG. 12, the employee category table may be associated with a location or region code, e.g., to identify the location or site or region where each company employee is located or has responsibility. For example, there may be numerous sales employee for a company, each of which is associated with a sales region. As another example, the various products of a company may be rolled up into or grouped into product lines. By defining a field 1238 for a location rollup code, the structure of FIG. 12 makes it possible to output a report which is grouped by sales region. Rollups may also be used for providing statistical analysis of group data such as averages, means, standard deviations, etc. Although in the embodiment of FIG. 12, the field for the location rollup code 1238 is shown as being a field of the employee category table 1216, a location field 1238 could also be provided in the detail table if desired.

The manner in which a function for loading a rollup code 908 operates will vary depending on the type of source data 806 with which it is configured to act, and thus it is provided as a function of various drivers 804 so that different programming instructions can be provided for use with different types of source data. As one example, a "define rollup code" function 908 may be provided in a driver 804 configured for use in connection with the database depicted in FIGS. 4A through 4F. In this example, a location field is already defined in the employee table 416 which can be directly used for location code purposes. In contrast, in the embodiment depicted in FIG. 1, there is no indication of location for an employee 120 associated with a particular flat file 101*a*. Thus, in one embodiment, a location rollup may not be possible for data obtained from the data source in FIG. 1. If, however, there is, e.g., another file which provides the home address for each employee in the company, it may be possible to use, e.g., the state of residence of each salesperson to infer the sales region that person is responsible for and thus define a location rollup code inferentially. Additionally, a "define rollup code" function may include access to information which can be used for defining a rollup code. For example, in connection with the data source depicted in FIG. 6, the "define data rollup" function 908 may contain, within that function, a table indicating, for each potential temperature station 612, whether that station is a northern hemisphere or a southern hemisphere station and thus could create a hemisphere rollup code on such basis. In some cases it may be desirable to provide for word recognition and/or searching for key words in the database in order to define additional rollups and/or structures.

In some situations, the rollup code will be relative to information which was not used in the data source as a basis for analyzing or grouping data (e.g., the hemisphere rollup code for the data source of FIG. 6). Thus, in these situations providing a rollup code involves providing an enhancement of the data by automatically providing additional elements which were not available (or at least not used) for outputting or analyzing information in the data source 806. Preferably, data is classified into categories and then grouped by an in-depth analysis of the data source's data.

In addition to defining rollups, the process may also store optional reference fields. In general, optional reference fields refer to fields which will typically not be used for grouping data such as free-text fields (comments, memo fields, invoice numbers, etc.) but which may be desired for inclusion in reports, etc.

Following loading of data definition codes and rollups, these data definition codes and rollups are saved 1034 in the new databases 808, e.g., by listing the categories into the various category tables 1202. Loading and saving data definition and rollup code 1033, 1034 is performed in a loop fashion 1035 to load and save the specific categories (specific Accounts, Companies, Employees and Locations, in the example of FIGS. 4A–4F).

In review, according to the depicted embodiment, step 1024 defines the categories (e.g. Account, Company, Employee and Location), as well as their data types (e.g. string or numeric). Step 1028 creates the category tables defined in step 1024 (and any other tables defined in step 1022). Step 1032 saves the data definition, typically in on standard table. Steps 1033 and 1034 load and save data definitions and rollup codes.

At this point in the process, although information relating to the structure of the data has been placed in the new databases 808, data which is the main subject of the source data 806 (e.g., accounting entries or transaction in the case of accounting source data, temperature data in the case of meteorological temperature source data) has not been loaded into the new databases 808. Accordingly, the main process 802 calls or activates a function 909 in the appropriate drivers 804 to load data 1036, save the data 1038, and repeat the process 1039 until all the desired data has been loaded and saved 1040. Thus at the end of this procedure 1036, 1038, 1040, the new databases 808 will be populated with data from one or more data sources 806.

In one embodiment information is verified as a part of the system described herein. For example rules may be defined in a driver or as part of the new database 808 to control the data that is extracted from the data source(s) 806. This can be in the form of validation of data as it is brought into the new database 808 and, preferably, reporting any item which does not meet the criteria of such rules, to provide error trapping and reporting. For example in the context of accounting packages, the present invention can be configured to verify whether the "books" are balanced.

When two or more data sources having different structures and/or produced using different brands or types of software are combined, by using the procedure of FIG. 10, these data from different types of sources can be populated into a common database structure, e.g., as depicted in FIG. 12. This facilitates common or standardized analysis and reporting for the data, preferably optimized to provide flexibility and speed of output.

In the embodiment of FIG. 10, the main process 802 can now build and, if desired, execute, data queries such as summarization queries 1042. In general, there are at least three types of queries which may be built. The first type of query may be provided which will be common to all new databases 808 which are created using the procedure of FIG. 10, such as a query which provides the number of entries in the detail table or the number of entries for a given data range (e.g., per quarter). Other queries may be built at least partially depending on the general information and data definition obtained with respect to one or more of the data sources 806, including rollups which may have been provided and accordingly could, if desired, be provided as part of a driver 804, specific to a particular data source. A third type of query may be provided to replicate or include queries or reports which were used in the original data source (e.g., as depicted in FIG. 4E).

Once a new database 808 is populated and appropriate queries are built, the main procedure 802 may close the tables and databases 1044 and the dynamic drivers 1046, e.g., to free up memory.

Although a major contemplated use of the present invention is in connection with providing standardized and/or enhanced reporting and analysis of data in one or more data sources, it is also possible to use the present invention in connection with data entry and data storage by using a database management system (e.g., Microsoft Access®, Excel®, FoxPro®, Btrieve®, etc.) In connection with the new databases 808. Although it is contemplated that a major use of the present invention will involve continuing to employ the original source data 806 for inputting and storage while maintaining a copy of the same information in the new databases 808 for reporting and analysis purposes, it is also possible to use the present invention for transferring data from one type of source data 806a, b, to another type, e.g., 806c, by first storing it in the new databases 808, as described above and, thereafter, downloading or exporting the information from the new databases 808 to a different type of source data 806c.

In light of the above description, a number of advantages of the present invention can be seen. The present invention facilitates standardization of reporting and analysis despite a variety in the brands or types of data sources used. The present invention provides for a system which can be optimized or otherwise provide improved performance in outputting or reporting data. The present invention provides for data reporting and analysis capability which is enhanced compared to data reporting and analysis of the data sources. Via sophisticated interrogation of the source data, in the context of an accounting system the present invention is able to mirror the chart of accounts setup in the data source. In one embodiment, the process extracts some or all defined rollups, optional reference fields, accounting period information. By performing the tasks automatically and eliminating (or reducing) the need for human analysis, the present invention is less labor-intensive and less time-intensive than previous methods, in some cases making it possible to populate new databases 808 in a matter of a few minutes or hours in situations that would require several days or weeks under previous methods. In one embodiment, the driver 804 can be configured to detect, analyze and maintain, in the new databases 808, any security, passwords, permissions, etc., that are used in the data source 806. In this way it is not necessary for a systems administrator to need to maintain a new and separate set of accounts, passwords, permissions, etc., for the new databases 808 in addition to that maintained with the original data source 806. Preferably, the system can be configured to perform updates substantially at predetermined intervals such as daily, weekly, etc.

A number of variations and modifications of the present invention can also be used. It is possible to use some aspects of the invention without using others. For example, it is possible to provide for populating a new database 808 without defining new or additional rollups. Although in the above description, the various drivers 804 can be provided as separate DLL files and are dynamic in the sense that as many as desired can be added simply by storing additional DLL files in the proper directory, it would also be possible to make an operable version of the invention in which the function performed by the function modules are provided as portions of or subroutines called by the main procedure 802 rather than being separately stored modules.

While the invention has been described by way of a preferred embodiment in certain variations and modifications, other variations and modifications can also be used, the invention being defined by the following claims:

What is claimed is:

1. A computer-implemented method comprising;
providing a driver which issues instructions for accessing data which may be stored in either of first and second different data sources, said driver containing program instructions configured for use in connection with said first data source;
using said driver to automatically obtain information about the data structure of said first data source without the need for human analysis of the first data source by accessing content of information stored in said first data source and mapping at least some information in said data source to procedures which provide a corresponding item in a new database, wherein said information about the data structure leads to optimization of said new database in which information from said first database is to be stored; and
creating a report from said new database.

2. A computer-implemented method usable in connection with accessing data which may be stored in either of first and second different data sources, the method comprising:
a first step in providing a first driver containing program instructions configured for use in connection with said first data source in the absence of said first driver being configured for use in connection with said second data source;
a second step for using said first driver to automatically obtain first information about the data structure of said first data source without the need for human analysis of the first data source by automatically accessing content of information stored in said first data source;
using said first information to define a structure for a first database different from said data sources wherein said first database did not exist before said step for using said first driver to automatically obtain first information; and
generating at least a first report based on information in said first database.

3. A computer-implemented method usable in connection with at least a first data source which stores first source data, said first source data including accounting data, said accounting data being used according to an accounting system which has a plurality of account parts, the method comprising:
using a computer to automatically obtain information about the data structure of said first data source without the need for human analysis of said first data source by accessing content of information stored in said first data source, wherein said information about the data structure includes information which can be used for optimizing a new database, if and when said new database is formed; and
storing at least some of said information about data structure in a data storage device.

4. A method as claimed in claim 3 wherein said step of forming said new database comprises forming said new database having structure different from the structure of said first data source.

5. A method as claimed in claim 4 wherein said step of creating a data repository is performed before said step of using a computer to obtain information about the data structure of said first data source.

6. A method as claimed in claim 3 further comprising forming said new database.

7. A method as claimed in claim 6 wherein said step of forming said new database comprises forming said new database has a structure different from the structure of said first data source.

8. A method as claimed in claim 6 wherein said new database is optimized, using said information about the data structure.

9. A method as claimed in claim 6 wherein said first data source is a database.

10. A method as claimed in claim 6 further comprising soliciting information from a user to be used, at least partially, in determining the structure of said new database.

11. A method as claimed in claim 10 wherein said step of soliciting includes displaying a dialog box.

12. A method as claimed in claim 10 wherein said step of soliciting includes displaying a list of choices.

13. A method as claimed in claim 6 further comprising populating said new database after said step of forming said new database.

14. A method as claimed in claim 3 wherein said information about data structure includes an identification of at least some of said account parts.

15. A method as claimed in claim 3 wherein said information about data structure includes stored queries in said first data source.

16. A computer-implemented method usable in connection with at least a first data source which stores first source data, the method comprising:
using a computer to automatically obtain information about the data structure of said first data source without the need for human analysis of said first data source by accessing content of information stored in said first data source, wherein said information about the data structure includes information which can be used for optimizing a new database, if and when said new database is formed; and
storing at least some of said information about data structure in a data storage device.

17. A method as claimed in claim 16 further comprising creating a data repository without first forming said new database.

18. A method as claimed in claim 17 wherein said step of creating a data repository is performed before said step of using a computer to obtain information about the data structure of said first data source.

19. A method as claimed in claim 16 further comprising forming said new database.

20. A method as claimed in claim 19 further comprising populating said new database after said step of forming said new database.

21. A method as claimed in claim 19 wherein said step of forming a new database comprises conversion of said first data source into a uniform database.

22. A method as claimed in claim 19 wherein said new database is optimized, using said information about the data structure.

23. A method as claimed in claim 16 wherein said step of forming said new database comprises forming said new database having a structure different from the structure of said first data source.

24. A method as claimed in claim 16 wherein said first data source is a database.

25. A method as claimed in claim 16 further comprising soliciting information from a user to be used, at least partially, in determining the structure of said new database.

26. A method as claimed in claim 25 wherein said step of soliciting includes displaying a dialog box.

27. A method as claimed in claim 25 wherein said step of soliciting includes displaying a list of choices.

28. A method as claimed in claim 16 wherein said first data source includes at least first and second tables.

29. A method as claimed in claim 28 wherein said information about the structure of said first data source includes information regarding how data in said first table is linked to data in said second table.

* * * * *